US008281301B2

(12) United States Patent   (10) Patent No.: US 8,281,301 B2
Kaneda                          (45) Date of Patent: Oct. 2, 2012

(54) METHOD AND APPARATUS FOR CONTROLLING STORAGE PROVISIONING

(75) Inventor: Yasunori Kaneda, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 1558 days.

(21) Appl. No.: 11/729,835

(22) Filed: Mar. 30, 2007

(65) Prior Publication Data

US 2008/0243947 A1    Oct. 2, 2008

(51) Int. Cl.
  G06F 9/44       (2006.01)
  G06F 9/445      (2006.01)
(52) U.S. Cl. ........................................ 717/174; 717/168
(58) Field of Classification Search .................... 717/174
     See application file for complete search history.

(56) References Cited

U.S. PATENT DOCUMENTS

| 4,916,608  | A  | * | 4/1990  | Shultz ........................ 718/104 |
| 6,453,392  | B1 | * | 9/2002  | Flynn, Jr. ..................... 711/151 |
| 6,854,034  | B1 |   | 2/2005  | Kitamura et al. |
| 6,898,670  | B2 | * | 5/2005  | Nahum ........................ 711/114 |
| 7,756,832  | B1 | * | 7/2010  | Mowry et al. ................. 707/638 |
| 2002/0174422 | A1 | * | 11/2002 | Kelley et al. .................. 717/178 |
| 2003/0200247 | A1 | * | 10/2003 | Banzhaf et al. ................. 709/1 |
| 2005/0210217 | A1 | * | 9/2005  | Yagi et al. ..................... 711/170 |
| 2005/0228948 | A1 | * | 10/2005 | Mikuma et al. ............... 711/114 |
| 2006/0010300 | A1 | * | 1/2006  | Arakawa et al. .............. 711/162 |
| 2008/0243947 | A1 | * | 10/2008 | Kaneda ........................ 707/203 |

OTHER PUBLICATIONS

Holland et al. "BladeCenter storage", Copyright 2005 IBM, retrieved from <http://ieeexplore.ieee.org/stamp/stamp.jsp?tp=&arnumber=5388759> total pp. 19.*
Steve Chidlow, "Storage Area Networks", JISC Technology and Standards Watch Report, Nov. 2003, retrieved from <http://www.jisc.ac.uk/media/documents/techwatch/tsw_03-07.pdf>, total pp. 20.*

* cited by examiner

Primary Examiner — Don Wong
Assistant Examiner — Marina Lee
(74) Attorney, Agent, or Firm — Mattingly & Malur, PC

(57) ABSTRACT

Providing a volume to a host computer by a storage system is automated for ensuring that an appropriate version of a storage control software is installed on a storage control module of the storage system that manages access of the host computer to the volume. When the volume on the storage system is allocated for use by the computer, a control module on the storage system is designated for managing the access to the volume. An operating system to be used on the computer when accessing the volume is determined, and a compatible version of the storage control software is uploaded and installed on the storage control module. Multiple storage control modules may be provided on the storage system and virtual machines may be used on the storage control modules for enabling simultaneous operation of more than one version of the storage control software on each storage control module.

21 Claims, 23 Drawing Sheets

| Volume Number | HDD WWN | | | | |
| --- | --- | --- | --- | --- | --- |
| | 1 | 2 | 3 | 4 | 5 |
| 111 | 101.11 | 101.12 | 101.13 | 101.14 | 101.15 |
| 112 | 101.21 | 101.22 | 101.23 | 101.24 | 101.25 |
| 113 | 101.31 | 101.32 | 101.33 | 101.34 | 101.35 |
| 114 | 101.41 | 101.42 | 101.43 | 101.44 | 101.45 |
| 115 | 101.51 | 101.52 | 101.53 | 101.54 | 101.55 |

VOLUME MANAGEMENT TABLE

FIG. 3

FIG. 5A — SUPPORT MATRIX 591

| OS | | Storage Control Software Version | | | |
|---|---|---|---|---|---|
| Vendor | Version | V1.0 | V2.0 | V3.0 | |
| A | 1995 | ✓ | ✓ | | |
| A | 2000 | | ✓ | ✓ | |
| A | 2003 | | | ✓ | |
| B | 7 | ✓ | ✓ | | |
| B | 8 | | ✓ | ✓ | |
| C | 2.4 | | | ✓ | |
| C | 2.6 | | | | |

5911 / 5912

FIG. 5B — SUPPORT MATRIX 591

| OS | | Storage Control Software Version | | | |
|---|---|---|---|---|---|
| Vendor | Version | V1.0 | V2.0 | V3.0 | V4.0 |
| A | 1995 | ✓ | ✓ | | |
| A | 2000 | | ✓ | ✓ | |
| A | 2003 | | | ✓ | ✓ |
| B | 7 | ✓ | ✓ | | |
| B | 8 | | ✓ | ✓ | |
| C | 2.4 | | | ✓ | |
| C | 2.6 | | | | ✓ |

5911 / 5912

FIG. 7A — ZONE MANAGEMENT TABLE (175)

| Zone Number (1751) | WWN in Zone (1752) |
|---|---|
| 0 | 186, 455, 101.11, 101.12, 101.13, 101.14, 101.15, 101.21, 101.22, 101.23, 101.24, 101,25, 101.31, 101.32, 101.33, 101.34, 101.35, 101.41, 101.42, 101.43, 101.44, 101.45, 101.51, 101.52, 101.53, 101.54, 101.55 |
| 1 | 156a, 101.11, 101.12, 101.13, 101.14, 101.15 |
| ⋮ | |

FIG. 7B — ZONE MANAGEMENT TABLE (175)

| Zone Number (1751) | WWN in Zone (1752) |
|---|---|
| 0 | 186, 455, 101.11, 101.12, 101.13, 101.14, 101.15, 101.21, 101.22, 101.23, 101.24, 101,25, 101.31, 101.32, 101.33, 101.34, 101.35, 101.41, 101.42, 101.43, 101.44, 101.45, 101.51, 101.52, 101.53, 101.54, 101.55 |
| 1 | |
| ⋮ | |

FIG. 7C — ZONE MANAGEMENT TABLE (175)

| Zone Number (1751) | WWN in Zone (1752) |
|---|---|
| 0 | 186, 455, 101.11, 101.12, 101.13, 101.14, 101.15, 101.21, 101.22, 101.23, 101.24, 101,25, 101.31, 101.32, 101.33, 101.34, 101.35, 101.41, 101.42, 101.43, 101.44, 101.45, 101.51, 101.52, 101.53, 101.54, 101.55 |
| 1 | 156b, 101.51, 101.52, 101.53, 101.54, 101.55 |
| ⋮ | |

| Zone Number (1791) | WWN in Zone (1792) |
|---|---|
| 1 | 155a, 15a-1 |
| : | |

ZONE MANAGEMENT TABLE (179)

FIG. 8A

| Zone Number (1791) | WWN in Zone (1792) |
|---|---|
| 1 | |
| : | |

ZONE MANAGEMENT TABLE (179)

FIG. 8B

| Zone Number (1791) | WWN in Zone (1792) |
|---|---|
| 1 | 155b, 15b-1 |
| : | |

ZONE MANAGEMENT TABLE (179)

FIG. 8C

| Volume Number 1541 | Access Permitted WWN 1542 | 154 |
|---|---|---|
| 111 | 15a-1 | |
| ⋮ | | |

LUN SECURITY TABLE

FIG. 9A

| Volume Number 1541 | Access Permitted WWN 1542 | 154 |
|---|---|---|
| 111 | | |
| ⋮ | | |

LUN SECURITY TABLE

FIG. 9B

| Volume Number 1541 | Access Permitted WWN 1542 | 154 |
|---|---|---|
| 111 | 15b-1 | |
| ⋮ | | |

LUN SECURITY TABLE

FIG. 9C

| Volume Number | OS | | Storage Control Software Version |
|---|---|---|---|
| | Vendor | Version | |
| 111 | A | 2000 | V3.0 |
| 415 | B | 7 | V1.0 |
| : | : | : | : |

VOLUME v. OS MANAGEMENT TABLE

FIG. 10A

| Volume Number | OS | | Storage Control Software Version |
|---|---|---|---|
| | Vendor | Version | |
| 411 | A | 2000 | V3.0 |
| 415 | B | 7 | V1.0 |
| : | : | : | : |

VOLUME v. OS MANAGEMENT TABLE

FIG. 10B

| Volume Number | OS | | Storage Control Software Version |
|---|---|---|---|
| | Vendor | Version | |
| 411 | A | 2000 | V3.0 |
| 112 | B | 7 | V1.0 |
| : | : | : | : |

VOLUME v. OS MANAGEMENT TABLE

FIG. 10C

| Storage Control Module Number (5931) | Physical CPU Workload (5932) | Status (5933) | Storage Control Software Version (5934) |
|---|---|---|---|
| 150a | | | |
| 150b | | | |
| ⋮ | | | |

RESOURCE MANAGEMENT TABLE

FIG. 17

| Storage Control Module Number (5951) | Physical CPU Workload (5952) | Virtual Storage Control Module Number (5956) | Status (5953) | Storage Control Software Version (5954) | Priority or Ratio (5955) |
|---|---|---|---|---|---|
| 150a | | 150a-1 | | | |
| | | 150a-2 | | | |
| | | ⋮ | | | |
| 150b | | | | | |
| ⋮ | | | | | |

EXTENDED RESOURCE MANAGEMENT TABLE

FIG. 18

METHOD AND APPARATUS FOR CONTROLLING STORAGE PROVISIONING

BACKGROUND OF THE INVENTION

1. Field of the Invention

The present invention relates generally to storage systems for storing data.

2. Description of Related Art

Storage System Interoperability/Connectivity

Storage systems typically are provided with a storage control program able to be executed on one or more CPUs in the storage system for managing the storage system and for controlling access to data stored on the storage system. The storage control program is usually composed of various modules, such as a response program for reading data to and writing data from a host computer, a cache control program for managing data stored in the cache, a disk drive control program for controlling writing data to the disks and reading data from the disks, a data copy program for creating replicas of volumes (e.g., enabling backups and archives), a volume administration program for managing volumes, and the like. The storage control program is always assigned a version number to enable management of the modification histories of the storage control program. The storage control program is sometimes updated for fixing bugs, optimizing performance and extending the functionality of the storage control program, thereby resulting in newer versions.

On the host computer side of an information system, operating systems (OSs) running on the host computers also have a version number. Knowing the correct version of the OS is important for application software to ensure interoperability between the OS and the application software. Accordingly, application software almost always specifies an appropriate or compatible OS version for use with the application software. To focus on the relationship between the storage control program on the storage system and the OS on a host computer, it is also important to have compatible versions of these programs to guarantee interoperability between them. However, sometimes the latest version of the storage control software is not able to interact properly with host computers that are running older versions of OS software, and vice versa.

Storage Provisioning

Processes for allocating volumes to host computers are disclosed in U.S. Pat. No. 6,854,034, to Kitamura et al., entitled "Computer System and a Method of Assigning a Storage Device to a Computer", filed Aug. 22, 2000, the disclosure of which is incorporated herein by reference. In this patent, configuration changes for host computers, network switches and a storage apparatus are made automatically when a volume is allocated to a host computer. A management means, when informed by a computer of a need for a new storage device, selects an available storage device for satisfying the computer's request, and instructs the storage device subsystem to set necessary data in such a manner that the requesting computer can access the selected device. The management means also returns necessary data to the requesting computer, such that the computer can modify its setting based on the data and can use the assigned device.

Virtual Machine Volume Image and Archive

The use of a virtual machine is a technology that enables running plural OSs (various versions of OSs and various different vendors' OSs) on a single computer. For example, Xen Virtual Machine Monitor available from XenSource, Inc., of Cambridge, England, is an open source implementation of virtual machine technology that runs on a host operating system and allows a user to run several guest operating systems alongside the host operating system on the same computer hardware at the same time.

One situation in which virtual machines are useful is for running archived execution images that contain old OSs, old applications and old data for the old applications. The old applications on these archived images may not be compatible with contemporary OSs, and thus, it is sometimes necessary for a computer to have an old OS installed that is compatible with the old applications in order to run the old applications and access the old data. In such a situation, the archived execution image may be retrieved to one or more volumes in the storage system. The old OS may then be installed on a virtual machine of a computer, rather than having to install the old OS as the primary operating system of the computer. However, the old OS operating on the virtual machine must also be able to establish a connection with the restored volume on the storage system. In cases where the retrieved OS running on the virtual machine is an older version of an OS, the retrieved OS might not be compatible with the current version of the storage control program running on the storage system that contains the volume to which the archived image was retrieved.

Generally, not all versions of OSs are supported by specific versions of storage control programs. If a volume image that includes an old OS image is retrieved from archives, an appropriate version of the storage control software should be used in the storage apparatus so as to be compatible with the old OS image. Otherwise, inconsistencies between the old OS and the current storage control program may result in interoperability problems. The prior art does not disclose any methods or procedures for applying an appropriate storage control software to enable proper operation between such a restored volume image and a computer that is using the restored volume image. Thus, it would be desirable to have a storage apparatus having execution capabilities for plural storage control programs so as to enable such interoperability.

BRIEF SUMMARY OF THE INVENTION

The invention relates to methods for provisioning appropriate storage control programs and allocating appropriate process resources when a volume in a storage system is allocated to a host computer. The invention is able to provide version-consistent volume provisioning for enabling connectivity between the storage control software running on the storage system and particular OSs running on host computers. The invention is useful for automating volume provisioning to a host computer, and for providing appropriate versions of storage control software to particular volumes in the storage system. These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 3 illustrates a volume management table of the invention.

FIGS. 5A-5B illustrate support matrices in embodiments of the invention.

FIGS. 7A-7C illustrate zone management tables utilized in embodiments of the invention.

FIGS. 8A-8C illustrate examples of zone management tables in embodiments of the invention.

FIGS. 9A-9C illustrate LUN security tables utilized in embodiments of the invention.

FIGS. 10A-10C illustrate examples of volume vs. OS management tables.

FIG. 17 illustrates an example of a resource management table.

FIG. 18 illustrates an example of an extended resource management table.

DETAILED DESCRIPTION OF THE INVENTION

Figure 1A:
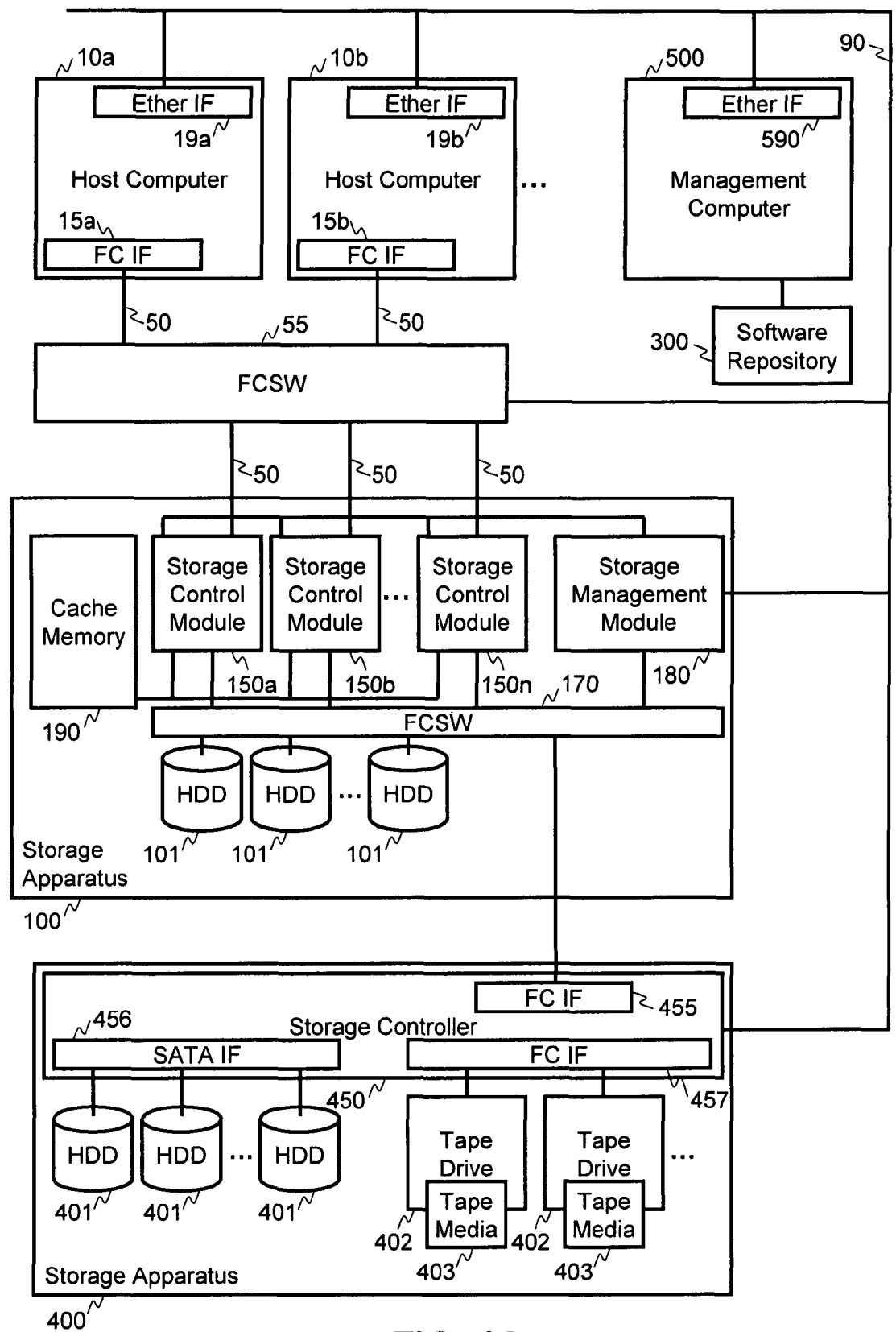
FIG. 1A illustrates an example of a hardware configuration in which the method and apparatus of the invention may be applied.

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. Further, the drawings, the foregoing discussion, and following description are exemplary and explanatory only, and are not intended to limit the scope of the invention or this application in any manner.

The invention includes a method and apparatus for provisioning an appropriate storage control program when a particular volume is allocated to a host computer. In some embodiments, an appropriate version of a storage control program is downloaded from a program repository when the volume is allocated to the host computer. The system of this invention may be composed of host computers, management computers and storage apparatuses. In some embodiments, the storage apparatus may include plural storage control program execution capability physically and/or virtually. When a particular volume is allocated or retrieved for use of a host computer, an appropriate version of the storage control program is uploaded from software repositories according to a support matrix provided under the invention, and which describes interoperability between particular OS vendors and versions and particular storage control program versions. The invention is also applicable to the case of long-term archiving of volume images that contain old versions of OS images.

System Configuration

FIG. 1A illustrates an example of an information system in which the invention may be applied. The information system for this embodiment includes one or more host computers 10 connected to a first storage apparatus 100 via a data network 50. Two host computers 10a and 10b are illustrated, with it being understood that any number of host computers 10 may be implemented, and that all host computers 10 may include generally similar hardware configurations. A management computer 500 may also be connected for communication with host computers 10 and first storage apparatus 100 via a management network 90. Further, a second storage apparatus 400 may be connected for communication with first storage apparatus 100 and also connected for communication with management network 90. The details of these components are described below with reference to FIGS. 1B-1F.

Figure 1B:
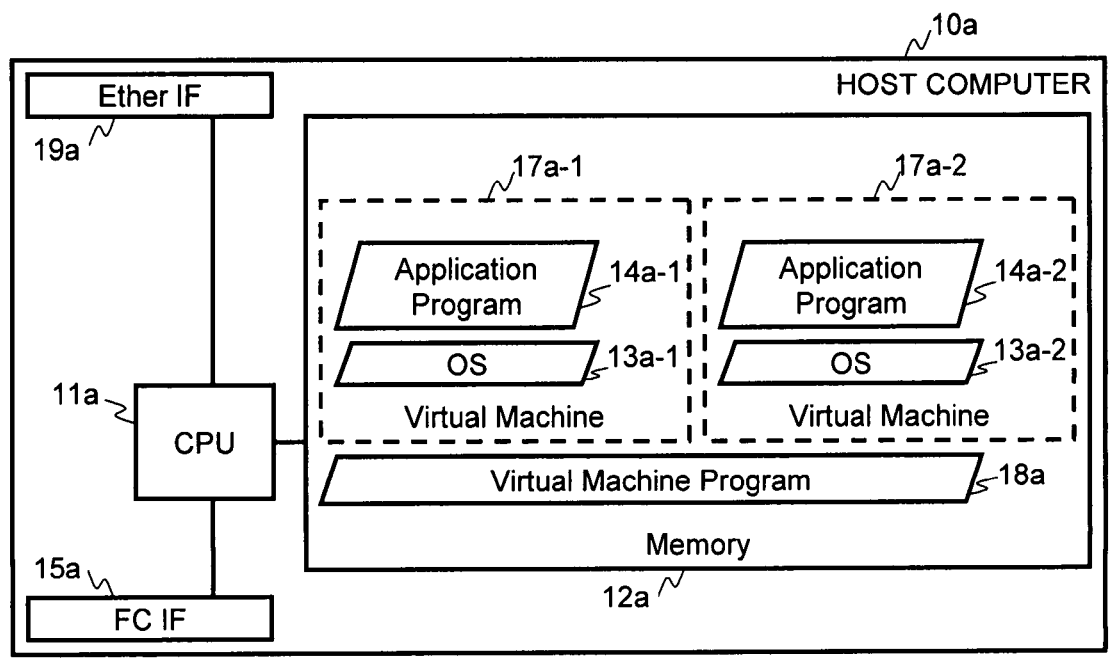
FIG. 1B illustrates details of the host computer of FIG. 1A.

As illustrated in FIG. 1B, host computer 10 includes an Ethernet interface (Ether IF) 19 for connection to management network 90, a CPU 11, a Fibre Channel (FC IF) 15 for connection to data network 50, and a memory 12. Each host computer 10 may include a virtual machine software 18 to enable at least one OS 13 to be executed in a virtual machine 17 provided by the virtual machine program 18. For example, FIG. 1B illustrates a first virtual machine 17a-1 and a second virtual machine 17a-2 in operation on host computer 10a. One or more application programs 14 may be executed on each of the OSs 13. Files for the OS 13 and application program 14 are stored in one or more volumes provided by the storage apparatus 100. The OS 13 and application program 14 issue read and write commands to first storage apparatus 100 to access volumes presented by first storage apparatus 100, such as for executing application program 14.

Each OS 13 may be loaded initially from one or more volumes in the first storage apparatus 100 to memory 12 by the virtual machine program 18. Once the base or primitive OS modules are loaded, most OSs load other modules by themselves. Each application program 14 may be loaded from the volumes of first storage apparatus 100 by OS 13, once OS 13 is installed in a designated virtual machine 17. The OS 13 and application program 14 may be able to updates file in the volumes. Thus, it may be seen that virtual machine program 18 allows a host computer to run plural OSs 13 and application programs 14 simultaneously.

Figure 1C:
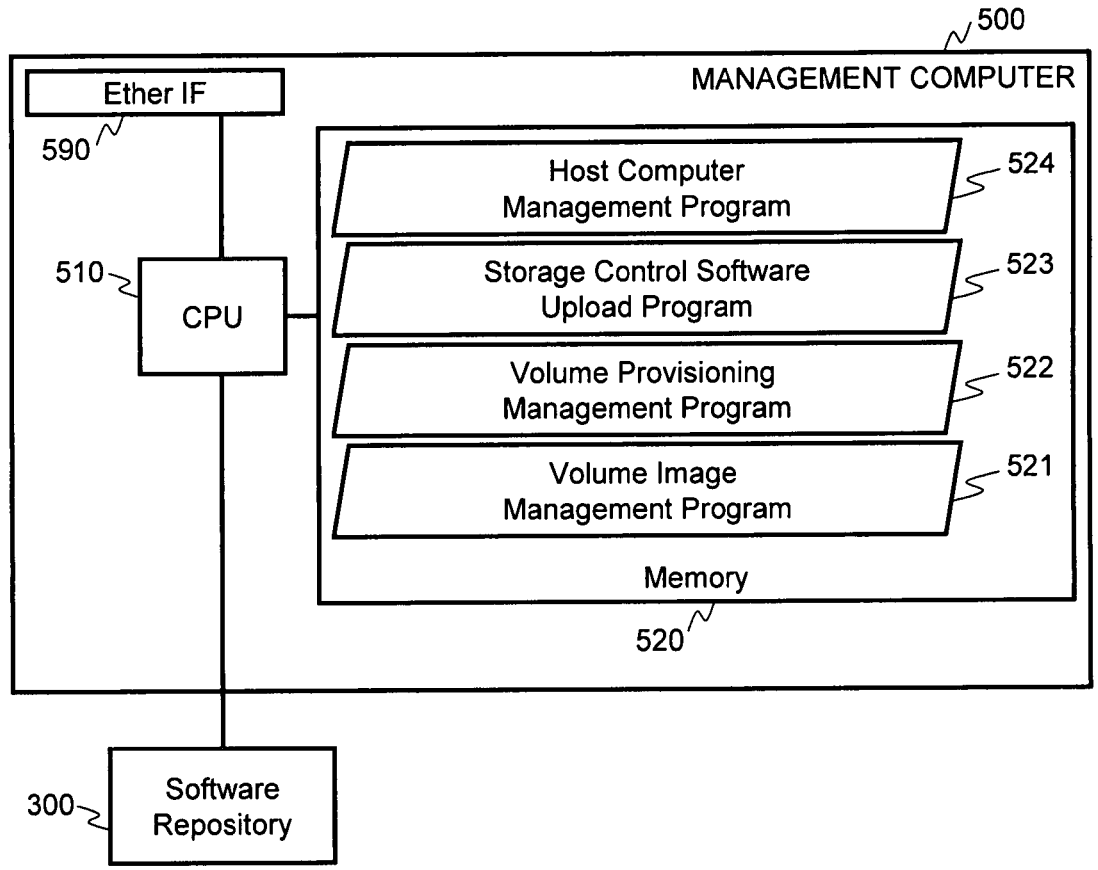
FIG. 1C illustrates details of the management computer of FIG. 1A.

At least one management computer 500 is connected to the host computer 10, the fibre channel switch (FCSW) 55, and the storage apparatuses 100 and 400 via the management network 90. A software repository 300 is also connected to management computer 500. As illustrated in FIG. 1C, management computer 500 includes a CPU 510, a memory 520, an Ethernet IF 590 for connection to management network 90, and a connection to software repository 300. Management programs loaded into memory 520 may include: a volume image management program 521 for archiving and retrieving volume images among the storage apparatuses; a volume provisioning management program 522 for provisioning appropriate volumes in the first storage apparatus 100 and for establishing connection between a volume, a storage control module 150 in first storage apparatus 100 and a host computer 10; a storage control software upload program 523 for uploading appropriate storage control software to the storage control module 150 in the first storage apparatus 100; and a host computer management program 524 for monitoring and controlling the host computers 10.

Referring back to FIG. 1A, at least one first storage apparatus 100 is connected for communication with data network 50. First storage apparatus 100 includes one or more storage devices, such as hard disk drives (HDDs) 101 which provide physical storage capacity for creating logical volumes for storing data. Plural storage control modules 150 are included in first storage apparatus 100 for executing one or more version of storage control software which may be uploaded by the management computer 500, as is discussed further below. First storage apparatus 100 also includes a cache memory 190 for temporarily storing data that is received and is read out by the storage control modules 150, and a storage management module 180 that manages usage of storage control modules 150. A Fiber Channel switch (FCSW) 170 (i.e., a back end switch) may be included in first storage apparatus 100 for connecting HDDs 101, any external storages (e.g., second storage apparatus 400 in this embodiment), storage control modules 150 and storage management module 180.

Figure 1D:
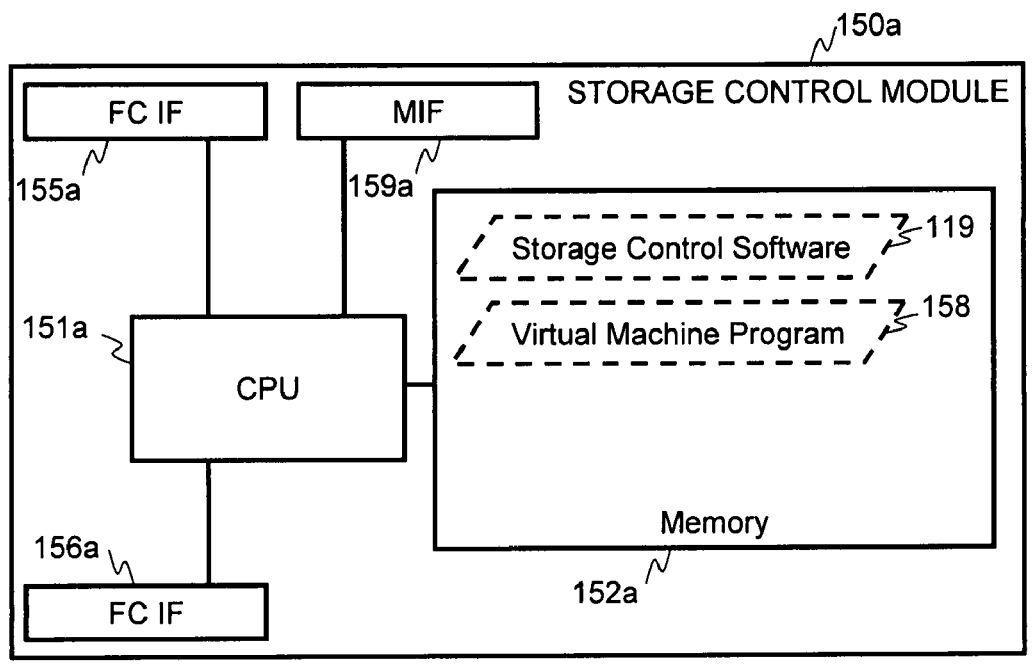
FIG. 1D illustrates details of the storage control module of FIG. 1A.

As illustrated in FIG. 1D, each storage control module 150 included in first storage apparatus 100 includes a CPU 151 for executing programs stored in a memory 152. Memory 152 stores programs, such as a specified version of a storage control program 119 that may be uploaded by the storage control software upload program 523 on the management computer 500 to the first storage apparatus 100. Storage control module 150 may also include a FC IF 155 for connecting to the data network 50, a FC IF 156 for connecting to the HDDs 101 via FCSW 170 and a management interface (MIF) 159 for connecting storage control module 150 to the storage management module 180. A virtual machine program 158 may also be present on one or more of storage control modules 150 for creating virtual machines on the storage control modules 150, as is discussed in later embodiments.

Figure 1E:
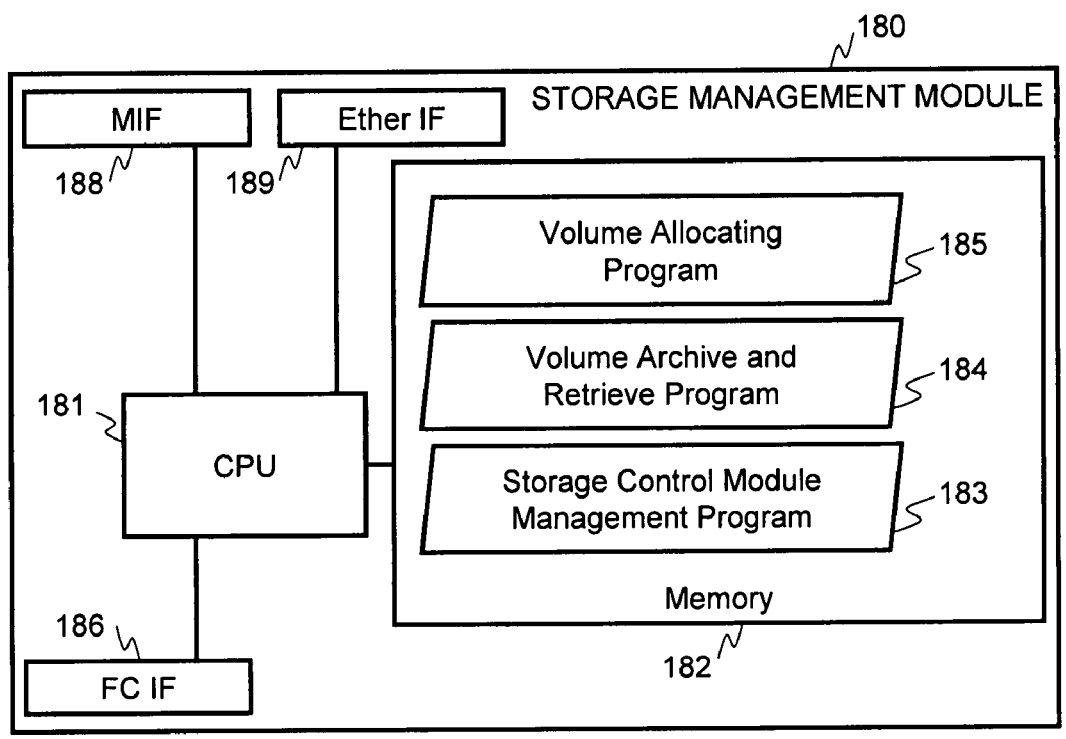
FIG. 1E illustrates details of the storage management module of FIG. 1A.

As illustrated in FIG. 1E, storage management module 180 includes a CPU 181 for executing programs stored in a memory 182, a FC IF 186 for connecting to the HDDs 101 and second storage apparatus 400 via FCSW 170, a MIF 188 for connecting to the storage control modules 150, and an Ethernet IF 189 for connecting to the management network 90. At least three programs may be loaded into memory 182 for execution by CPU 181. In the embodiment illustrated, memory 182 stores: a storage control module management program 183 for monitoring and controlling the usage of storage control modules 150; a volume archive and retrieval program 184 for archiving and retrieving volumes; and a volume allocating program 185 for creating and allocating volumes.

Figure 1F:
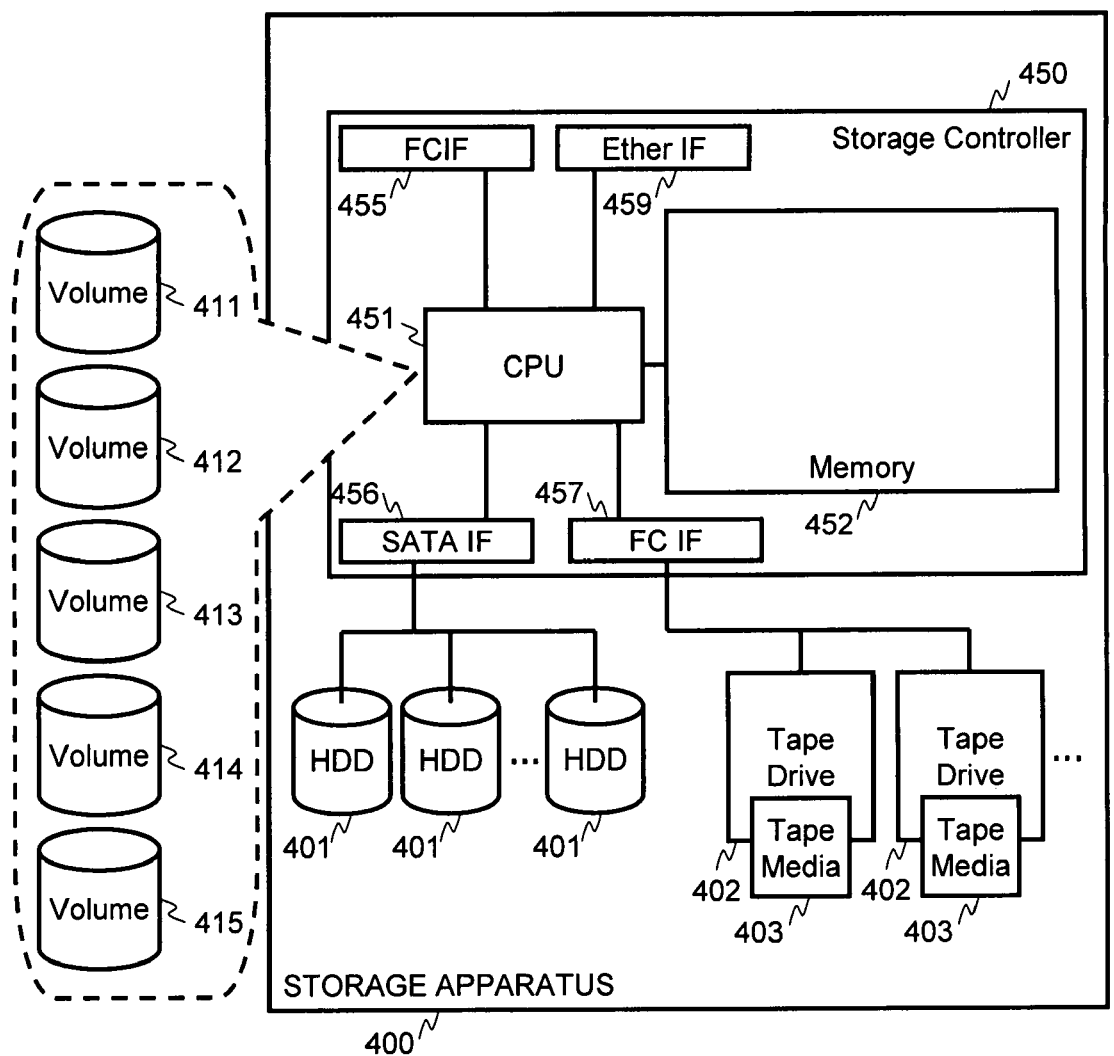
FIG. 1F illustrates details of the storage apparatus of FIG. 1A.

In the embodiment illustrated in FIG. 1A, second storage apparatus 400 is attached to the first storage apparatus 100. The second storage apparatus 400 is composed of storage controller 450, one or more HDDs 401, and/or one or more tape drives 402 for reading and writing to one or more tape media 403. Storage controller 450 may be configured to provide volume archiving areas, which are composed using HDDs 401 or tape media 403. As illustrated in FIG. 1F, storage controller 450 may include: a CPU 451 for executing programs stored in a memory 452; a FC IF 455 for connecting to the data network 50; a serial ATA (SATA) IF 456 for connecting to the HDDs 401 (when HDDs 401 are SATA HDDs), a FC IF 457 for connecting to the tape drives 402, and an Ethernet IF 459 for connecting to the management network 90.

A plurality of volumes, such as volumes 411-415, may be provided by second storage apparatus 400 for use as volume archiving areas. In the illustrated embodiment, HDDs 401 and tape medium 403 are used for volume archiving. Although, other storage means such as optical disks (not shown) may also be used. Bit cost (cost per capacity of storage) at the second storage apparatus 400 is preferably substantially lower than at the first storage apparatus 100, so that second storage apparatus 400 is appropriate for use for volume archiving. Accordingly, in some embodiments, low cost SATA HDDs may be used as HDDs 401 in second storage apparatus 400, while more expensive high performance Fibre Channel HDDs may be used as HDDs 101 in first storage apparatus 100.

The host computers 10 and the first storage apparatus 100 are connected to data network 50. The data network 50 in the embodiment illustrated in FIG. 1A is a Fibre Channel network. However other network types, such as Ethernet and Infiniband may be used. Network switches and hubs can be used for making up the network for connecting to each other. In FIG. 1A, FC switch (FCSW) 55 is used for connecting network elements to each other. Host computer 10 and storage apparatus 100 have one or more FC IFs for connecting to the FC data network 50.

The host computers 10, FCSW 55, first storage apparatus 100 and second storage apparatus 400 are connected to the management computer 500 via management network 90. The management network 90 in the illustrated embodiment is Ethernet. However, other network and data transfer means, such as RS232C, may be used. The host computer 10, the management computer 500, FCSW 55, first storage apparatus 100 and second storage apparatus 400 have one or more Ethernet interface boards (Ether IFs) for enabling connection to the Ethernet management network 90.

Figure 2:
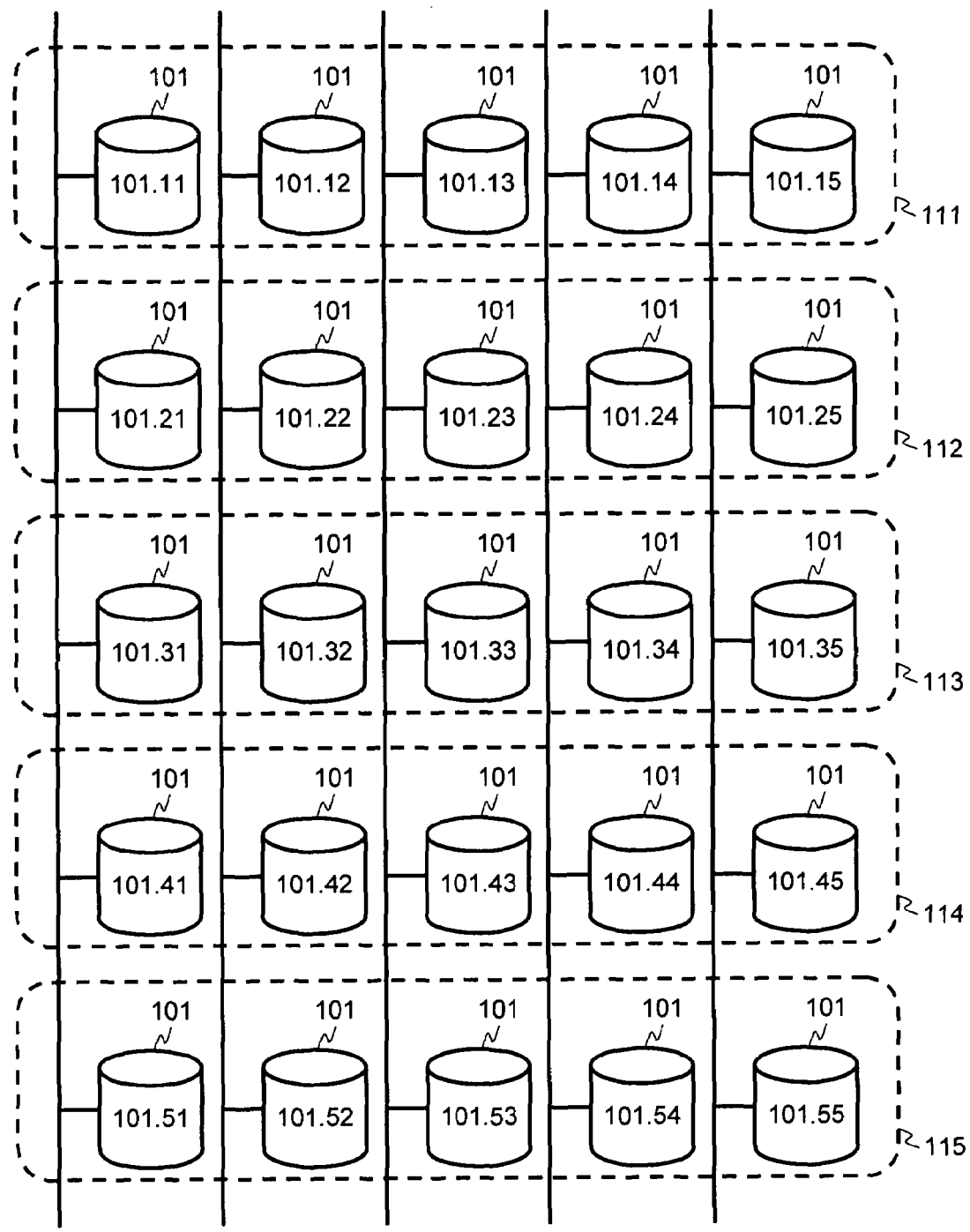
FIG. 2 illustrates volumes of the storage apparatus in an exemplary embodiment of the invention.

FIG. 2 illustrates an exemplary configuration of volumes at the storage apparatus 100 in the embodiment of FIG. 1A. Five logical volumes 111-115 are provided on HDDs 101, with each volume 111-115 being composed of five HDDs 101. A volume may store redundant or parity data according to RAID technologies for data protection or performance. Each HDD 101 has a WWN (World Wide Name) for identifying the particular HDD 101. Actual WWNs are 64 bits in length, and accordingly, for illustration purposes in FIG. 2, the WWNs illustrated as being assigned to each HDD are shortened to numbers 101.11 to 101.55, rather than using actual 64 bit numbers.

FIG. 3 illustrates a volume management table 188 that is used by the storage management module 180 for managing the relationships between volumes, such as volumes 111-115 and HDDs 101. Volume management table includes a volume number field 1881 and a HDD WWN field 1882. The HDD WWN field 1882 is divided into five columns for listing the WWNs of the HDDs 101 designated for each volume. Of course, the number of HDDs assigned for a volume may vary according to how the storage system is set up, what the RAID configuration is, and the like.

Figure 4:
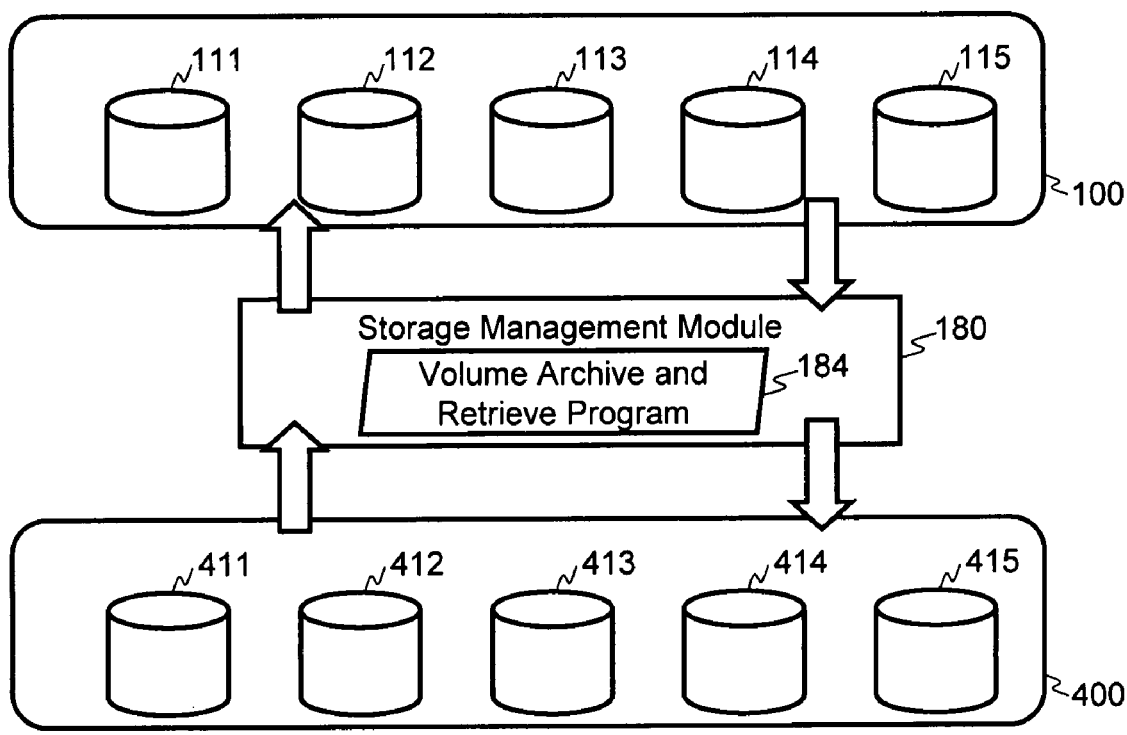
FIG. 4 illustrates relations of volumes in the storage apparatus of the invention.

FIG. 4 illustrates a relationship between volumes in the first storage apparatus 100 and volumes in the second storage apparatus 400. The volumes 411-415 in the second storage apparatus 400 are provided by HDDs 401 or by tape medium 403. A volume 111-115 in the first storage apparatus 100 may be archived to and/or retrieved from a volume 411-415 in the second storage apparatus 400. A volume is archived and retrieved by the operation of volume archive and retrieve program 184 in the memory 520 on the storage management module 180. Thus, for example, the data stored on volume 111 on first storage apparatus 100 may be archived to volume 411 on second storage apparatus 400. At a later point in time, it might be necessary to access the archived data. The data stored on volume 411 might be retrieved from volume 411 and stored to one of volumes 111-115 on first storage apparatus 100 to enable access to the data by a host computer 10.

Support Matrix

FIGS. 5A and 5B illustrate examples of a support matrix 591 implemented according to the invention. The support matrix 591 is used for determining interoperability among OS vendors, OS versions and storage control software versions. Support matrix 591 includes an OS field 5911 that includes columns for OS vendor and OS version, and a storage control software version field 5912 that lists applicable versions of the storage control software and their compatibility with the listed OS versions. For example, OS-A version 2003 is illustrated as being supported under the storage control software version V3.0; however the storage control software versions V1.0 and V2.0 do not support OS-A version 2003. In the embodiment illustrated in FIG. 1A, the support matrix 591 is maintained in the management server 500.

Installing a New OS

Figure 6:
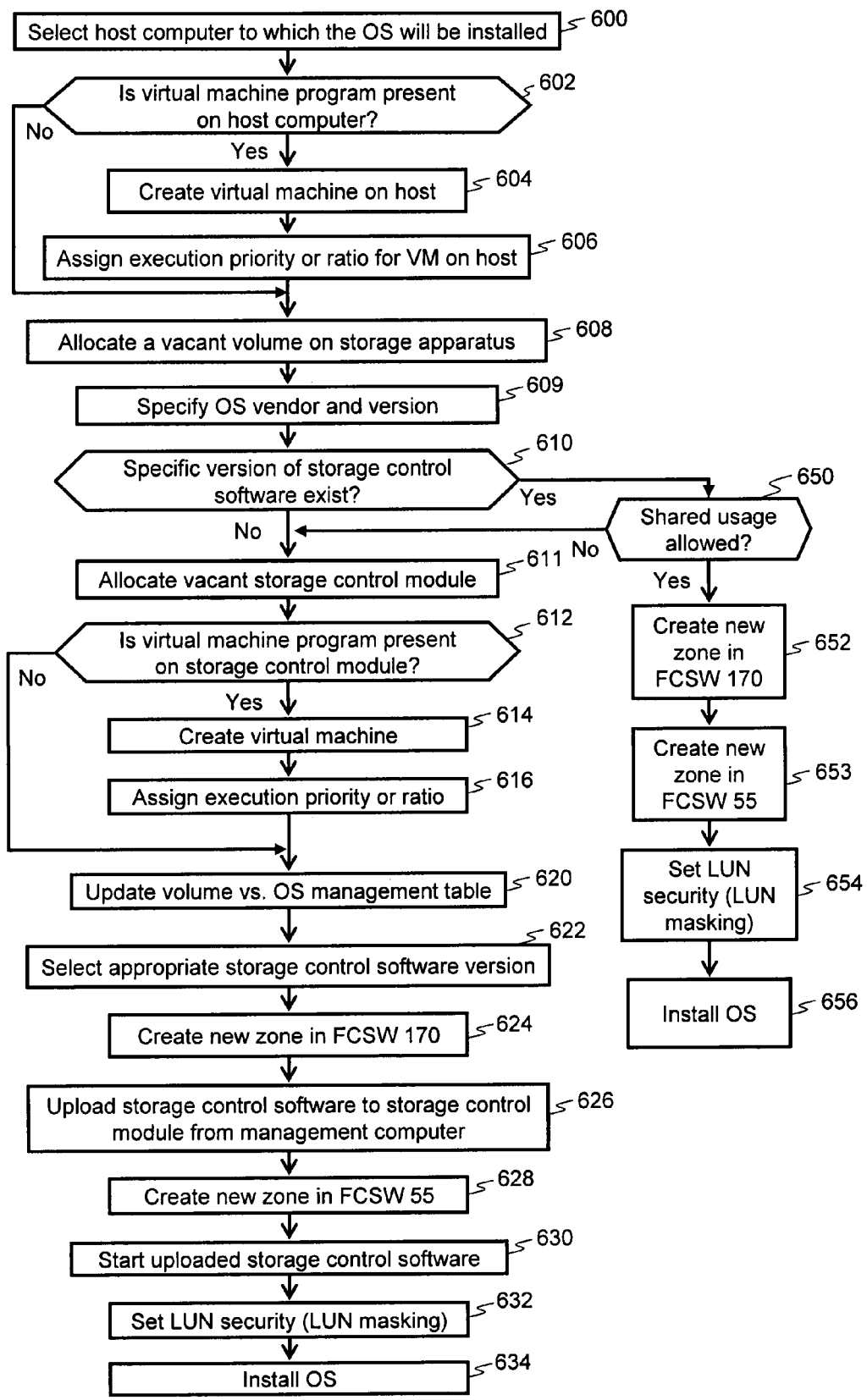
FIG. 6 illustrates a process flow for installing an operating system to a volume in the storage apparatus.

FIG. 6 illustrates a process flow for installing an OS to a host computer, such as a new OS, and for ensuring compatible functionality between a volume in storage apparatus 100 that stores the OS and a storage control module 150 in the first storage apparatus 100 that enables access of the host computer 10 to the volume. In the example below, a first OS 13*a*-1 will be installed to a host computer.

STEP 600: An administrator at management computer 500 selects a host computer 10 to which to install the first OS 13*a*-1 by using the host computer management program 524. In this example, it will be assumed that host computer 10*a* is selected.

STEP 602: The host computer management program 524 checks whether a virtual machine program 18 is present on the selected host computer 10*a*. When a virtual machine program 18 is not present, the process skips to STEP 608 and the first OS 13*a*-1 will be installed on the selected host computer without the use of a virtual machine on the host.

Figure 14A:
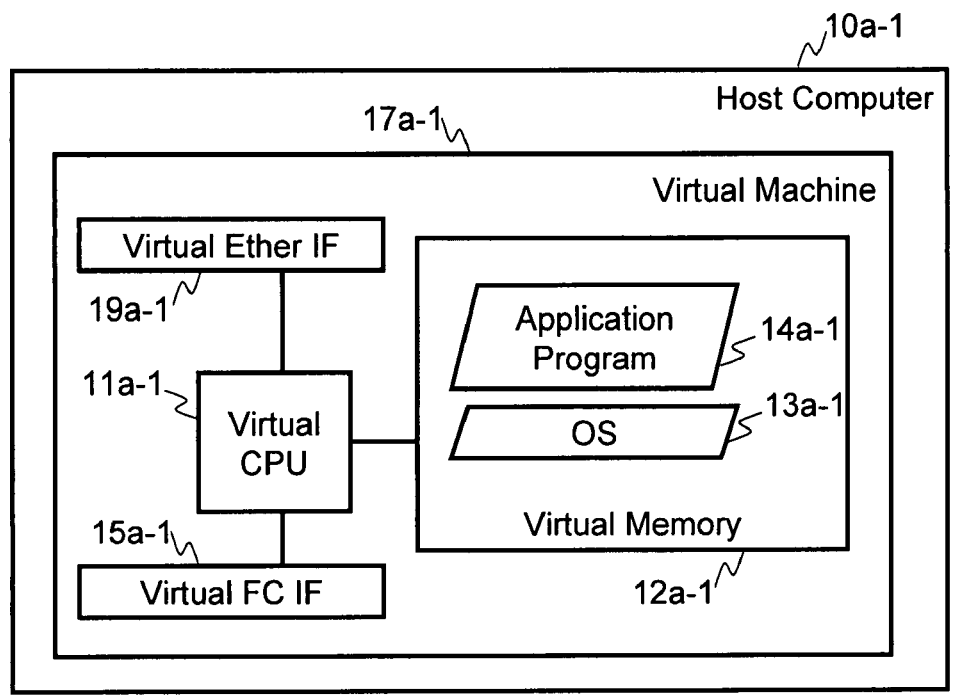
FIGS. 14A-14B illustrate examples of virtual machines according to the invention.

STEP 604: The host computer management program 524 creates a virtual machine 17 for installing the first OS 13*a*-1 using the virtual machine software 18. In this example, a virtual machine 17*a*-1 is created. FIG. 14A illustrates a configuration of virtual machine 17*a*-1 on host computer 10*a*. The virtual machine 17*a*-1 on the host computer 10*a* is composed of a virtual CPU 11*a*-1, a virtual memory 12*a*-1, a virtual FC IF 15*a*-1 and a virtual Ethernet IF 19*a*-1, thereby essentially creating a virtual host 10*a*-1. A unique WWN may be assigned to each virtual FC IF, even though the virtual IF operates through the real FC IF. The use of a unique WWN for a virtual IF enables each virtual IF to be treated as a real IF. This enables the use of FC zoning and LUN security for the virtual IF in the same manner as if it were a real IF.

STEP 606: The host computer management program 524 may assign an execution priority or ratio to the virtual machine 17*a*-1 if the administrator specifies such, so that each virtual machine may have an allotted execution priority or ratio.

STEP 608: The volume provisioning management program 522 sends a request to the volume allocating program 185, requesting that first storage apparatus 100 allocate a new volume in the storage apparatus 100. Volume allocating program 185 makes a new entry in a volume vs. OS management table 191, as illustrated in FIG. 10Ao Volume vs. OS management table 191 includes a volume number field 1911, an OS field 1912 that includes entries for vendor and version of the OS, and a storage control software version field 1913. Volume management table 191 shows which version of OS and storage control software 119 is installed for each volume. Since volume 111 is newly allocated, the OS field 1912 and storage control software version field 1913 will not initially have entries other than volume number 1911. In this example, volume number 111 is allocated.

STEP 609: An administrator specifies OS vendor and version for the first OS 13*a*-1 being installed using the host computer management program 524. Alternatively, the administrator may specify a storage control software version instead. In the second case, a specified version of the storage control software should be used and STEP 622 is skipped. In the current example, OS vendor A, version 2000 is specified as the version of OS to be installed. If a vendor and/or version of OS are specified that are not supported, the volume provisioning management program 522 may return an error to the administrator, or may select the latest version of storage control software in STEP 622.

STEP 610: The volume provisioning management program 522 checks whether the specific version of storage control software 119 (in this example "version 1.0") already exists in the first storage apparatus 100 by referring to entry 5934 in a resource management table 593, as illustrated in FIG. 17, or entry 5994 in extended resource management table 595, as illustrated in FIG. 18. Resource management table 593 includes a storage control module number field 5931, a physical CPU workload field 5932, a status field 5933 and a storage control software field 5934. When the storage control module management program 522 allocates a storage control module, the resource management table is updated. Extended resource management table 594 includes additional fields for when a virtual machine program 158 is present on a storage control module 150, and is discussed further below. Volume provisioning management program 522 checks table 593 or 595 to determine the storage control software version for each storage control module (or virtual storage control module) to determine if the specific version already exists in a storage control module. If the specific version already exists, the process goes to Step 650 to determine if sharing is allowed. If the specific version does not already exist, or if sharing is not allowed, the process proceeds to Step 611.

STEP 611: The volume provisioning management program 522 sends a request to the storage control module management program 183 to allocate a storage control module 150 for use in controlling and managing input/output (I/O) requests from the host computer, such as read and write requests, to volume 111. In this example, the storage control module 150*a* is selected. The storage control module management program 522 is able to select an available storage control module 150 by referring to resource management table 593, as illustrated in FIG. 17.

STEP 612: The storage control module management program 183 checks whether a virtual machine program 158 is present on the storage control module 150. If a virtual machine program 158 is not present, the process skips to STEP 620 for implementation without a virtual machine.

STEP 614: The storage control module management program 183 creates a virtual machine using virtual machine software 158 in the storage control module 150 (150*a* in this example).

STEP 616: The storage control module management program 183 may assign an execution priority or ratio to the new virtual machine if the volume provisioning management program 183 specifies this according to an administrator's direction.

STEP 620: The volume provisioning management program 522 updates the volume vs. OS management table 191. In the current example, the volume vs. OS management table 191 is updated as illustrated in FIG. 10A, so that for volume 111 the OS is vendor A, version 2000.

STEP 622: The volume provisioning management program 522 selects an appropriate version of storage control software 119 according to the support matrix 591. In this example, either version 2.0 or version 3.0 may be selected as being compatible with OS vendor A, version 2000, so it will be assumed that the latest available version of the storage control software is chosen, and volume vs. OS management table 191 is updated as illustrated in FIG. 10A to include the version for the storage control software 119.

STEP 624: The storage control module management program 183 creates a new Fibre Channel zone in the FCSW 170. In the current example, a zone management table 175 is updated to show that a new zone 1 was created for the HDDs allocated to volume 111 and the FC IF 156a of storage control module 150a. FIG. 7A illustrates updated zone management table 175 that includes a zone number field 1751 and a WWN in zone field 1752. Accesses from FC IF 156a to HDD 101.11 to 101.15 are executed exclusively in the FC zone 1.

STEP 626: The storage control software upload program 523 uploads and installs the appropriate version of storage control software 119 from the software repository 300 to the storage control module 150 via the storage control management program 183. If a virtual machine was created in the storage control module 150, the storage control software 119 is uploaded and installed onto the virtual machine in the storage control module 150. In the current example, version 3 of storage control program 119 is uploaded to storage control module 150a.

STEP 628: The volume provisioning management program 522 creates new a fibre channel zone in the FCSW 55. In the current example, a zone management table 179 is updated in zone 1. FIG. 8A illustrates updated zone management table 179, that includes a zone number field 1791 and a WWN in zone field 1792. Accesses from FC IF 15a to 155a are executed exclusively via zone 1.

STEP 630: The volume provisioning management program 522 starts the storage control software 119 that was uploaded to the storage control module 150 in STEP 626. In the current example, version 3 of storage control program 119 is started running in storage control module 150a.

STEP 632: The volume provisioning management program 522 sets LUN (logical unit number) security (i.e., LUN masking). In the current example, a LUN security table 154 in the storage controller module 150a is updated. FIG. 9A illustrates updated LUN security table 154 that includes a volume number (LUN) field 1541 and an access permitted WWN field 1542. By implementation of LUN masking, accesses from FC IF 15a to the volume 111 are executed exclusively.

STEP 634: An administrator installs the OS into the host computer 10. In the current example the OS 13a-1 is installed into the virtual machine 17a-1 of host computer 10a. Thus, it may be seen from the foregoing, that the invention automatically uploads and installs a compatible version of the storage control program 119 to a selected storage control module 150 to ensure compatibility with a version of an OS being installed to a host computer 10.

STEP 650: The volume provisioning management program 522 checks if the previously-loaded storage control software 119 of the desired version number can be shared. An administrator may determine whether sharing is allowed, or the storage provisioning management program 522 may make the determination according to a virtual machine execution priority or ratio according to the resource management table 593. If sharing of the storage control module 150 having the previously-loaded storage control software 119 of the desired version is allowed, the process goes to STEP 652. If sharing is not allowed, the process goes back to STEP 611.

STEP 652: The storage control module management program 183 creates a new fibre channel zone in the FCSW 170.

STEP 653: The volume provisioning management program 522 creates new fibre channel zone in the FCSW 55.

STEP 654: The volume provisioning management program 522 sets LUN security (LUN masking).

STEP 656: The volume provisioning management program 522 installs the OS in the host 15a.

Archiving a Volume Image

Figure 11:
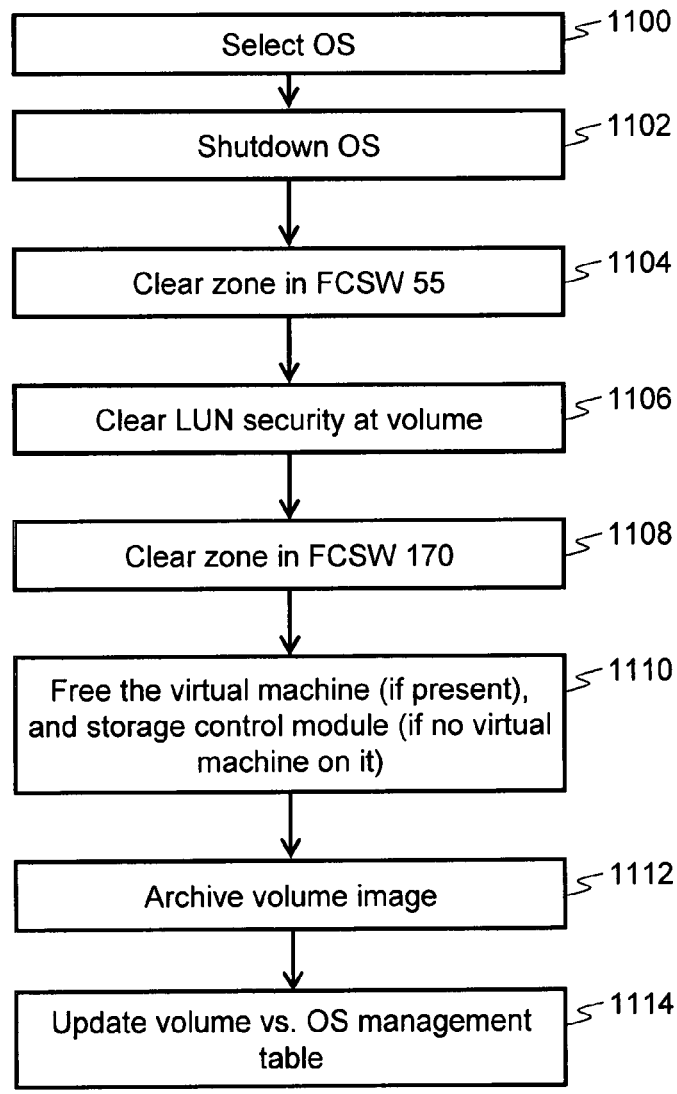
FIG. 11 illustrates a process flow for archiving a volume to the storage apparatus.

FIG. 11 illustrates a process flow for archiving a volume image from first storage apparatus 100 to second storage apparatus 400. In this example, the data of volume 111 in first storage apparatus 100 will be archived to volume 411 in second storage apparatus 400.

STEP 1100: An administrator uses the host computer management program 524 to select an OS for archiving. In this example, the OS 13a-1 on host 10a is selected.

STEP 1102: The selected OS is shutdown on host 10.

STEP 1104: The volume provisioning management program 522 clears fibre channel zone in the FCSW 55. In this example, zone management table 179 in the FCSW 55 is updated from as illustrated in FIG. 8A to FIG. 8B, by deleting the entries for 155a and 15a-1.

STEP 1106: The volume provisioning management program 522 clears LUN security at the volume. In this example, the LUN security table 154 in the storage controller module 150a is updated from FIG. 9A to FIG. 9B by deleting the entry for 15a-1 for volume 111.

STEP 1108: The volume archive and retrieve program 184 clears fibre channel zone 1 in the FCSW 170. In this example, the zone management table 175 in the FCSW 170 is updated from FIG. 7A to FIG. 7B.

STEP 1110: The volume provisioning management program 522 asks the storage control module management program 183 to free the virtual machine. In this example, the storage control module 150a is freed.

STEP 1112: The volume image management program 521 requests the volume archive and retrieve program 184 in storage management module 180 to archive the data of volume 111. In this example, the image of volume 111 is archived to volume 411 in the second storage apparatus 400 by copying the data contained in volume 111, including the OS 13a-1 and any application software 14, to volume 411.

STEP 1114: The volume provisioning management program 522 updates the volume vs. OS management table 191. In this example, the volume vs. OS management table 191 is updated from FIG. 10A to FIG. 10B, so that the OS version and storage control software version for archive volume 411 are recorded.

Updating Storage Control Software Version and Support Matrix Table

Figure 12:
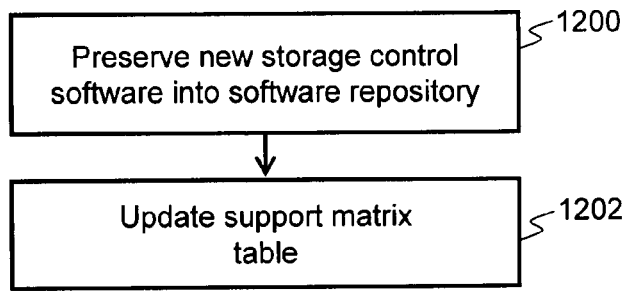
FIG. 12 illustrates a process flow of updating storage control software versions and the support matrix table.

FIG. 12 illustrates a process flow for updating the storage control software version and support matrix table 591, such when a new version of the storage control software is released. In this embodiment "version 4.0 storage control software" is released.

STEP 1200: New storage control software 119 is loaded into the storage software repository 300. In this example, version 4.0 of storage control software 119 has been released and stored to software repository 300 so that it can be uploaded to storage control modules 150 when needed.

STEP 1202: The support matrix table 591 is updated to reflect compatibility of the new version of the storage control software with the OSs listed in the matrix table 591. In this example, the support matrix table 591 is updated from FIG. 5A to FIG. 5B.

Retrieving Volume Image

Figure 13:
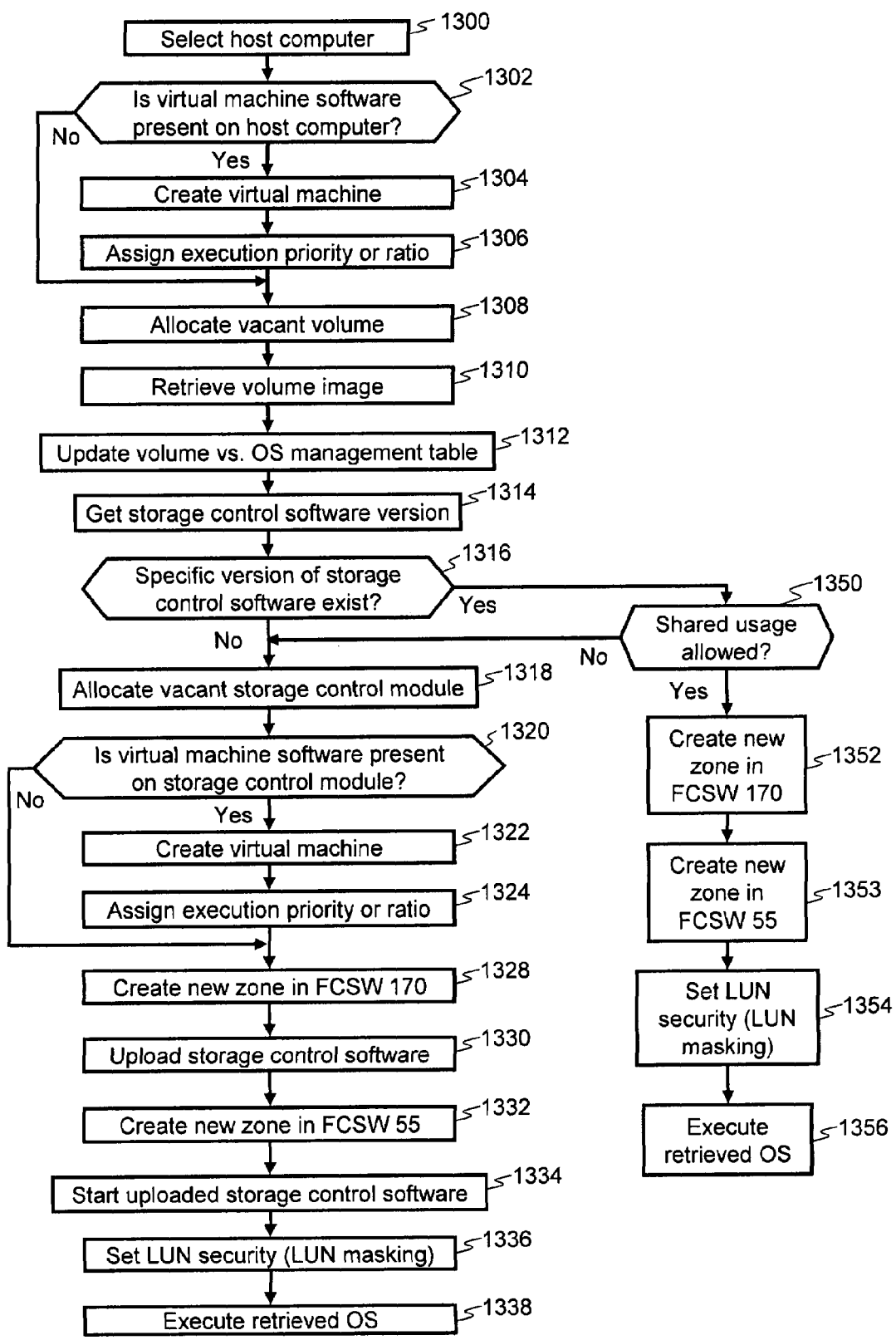
FIG. 13 illustrates a process flow of retrieving a volume from one storage apparatus to another storage apparatus.

FIG. 13 illustrates a process flow for retrieving a volume from the second storage apparatus 400 to the first storage apparatus 100, such as when retrieving an archived volume image to the first storage apparatus 100. In this embodiment volume 415 in second storage apparatus 400 is retrieved to volume 112 in first storage apparatus 100.

STEP 1300: An administrator uses the host computer management program 524 to select a host computer to which the OS on volume 415 will be retrieved. In this example, host computer 10b is selected.

STEP 1302: The host computer management program 524 checks if a virtual machine program 18 is present on the selected host computer 10. If a virtual machine program 18 is not present, the process skips to STEP 1308.

Figure 14B:
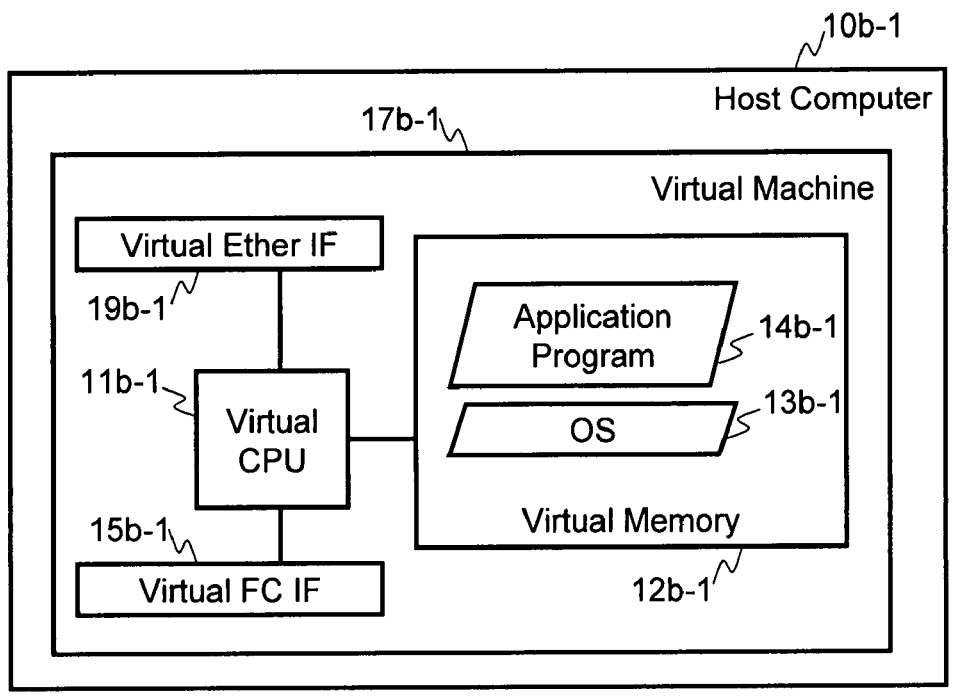

STEP 1304: The host computer management program 524 creates a virtual machine 17 using the virtual machine software 18 for running the retrieved OS. In this example, a virtual machine 17b-1 is created on host 10b. FIG. 14B illustrates an example of a configuration of virtual machine 17b-1. Virtual machine 17b-1 in the host computer is composed of a virtual CPU 11b-1, a virtual memory 12b-1, a virtual FC IF 15b-1 and a virtual Ethernet IF 19b-1, essentially creating a virtual host computer 10b-1.

STEP 1306: The host computer management program 524 may assign an execution priority or ratio to the virtual machine if the administrator so specifies.

STEP 1308: The volume provisioning management program 522 asks the volume allocating program 185 to allocate a new volume in the storage apparatus 100. In this example, the volume 112 is selected to receive the volume image.

STEP 1310: The volume image management program 521 sends a request to the volume archive and retrieve program 184 to retrieve the volume. In this example, the image of volume 415 is retrieved to volume 112 by copying all data contained in volume 415 on second storage apparatus 400 to volume 112 on first storage apparatus 100, including the OS software and any application software.

STEP 1312: The volume provisioning management program 522 updates the volume vs. OS management table 191 to reflect that volume 112 now contains the OS of volume 415. In this example, the volume vs. OS management table 191 is updated from FIG. 10B to FIG. 10C. Of course, if volume 415 is to be retained, a duplicate entry in the table 191 may be made for volume 112, rather than replacing the volume number of volume 415 with volume 112.

STEP 1314: The volume provisioning management program 522 gets the version of storage control software 119 that is used from the volume vs. OS management table 191 for volume 112. In this example, "version 1.0" is the version that needs to be used.

STEP 1316: The volume provisioning management program 522 checks whether the specific version of storage control software 119 (in this example "version 1.0") already exists in the first storage apparatus 100 by referring to entry 5934 of resource management table 593 or entry 5954 of extended resource management table 595. If the specific version of storage control software already exists (i.e., has been previously uploaded to a storage control module 150 and is still present for use), the process goes to STEP 1350 since it may not be necessary to load the particular version again if shared use is allowed.

STEP 1318: The volume provisioning management program 522 sends a request to the storage control module management program 183 to allocate a storage control module 150 for controlling volume 112. In this example, the storage control module 150b is selected.

STEP 1320: The storage control module management program 183 checks if a virtual machine program 158 is present on the storage control module 150. If a virtual machine program 158 is not present, the process skips to STEP 1328.

STEP 1322: The storage control module management program 183 creates a virtual machine using the virtual machine software 158 in the storage control module 150.

STEP 1324 The storage control module management program 183 may assign an execution priority or ratio to the virtual machine if the volume provisioning management program 183 specifies this according to an administrator's direction.

STEP 1328: The storage control module management program 183 creates a new fibre channel zone in the FCSW 170. In this example, zone management table 175 is updated from FIG. 7B to FIG. 7C. Accesses from FC IF 156b to HDDs 101.51-101.55 are executed exclusively through zone 1 of FCSW 170.

STEP 1330: The storage control software upload program 523 uploads and installs the appropriate version of storage control software 119 from the software repository 300 to the storage control module 150 via the storage control management program 183. In this example, version 1.0 is uploaded according to the result of STEP 1314.

STEP 1332: The volume provisioning management program 522 creates a new fibre channel zone in the FCSW 55. In this example, zone management table 179 is updated from FIG. 8B to FIG. 8C. Accesses from FC IF 15b1 to 155b are executed exclusively via zone 1 of FCSW 55.

STEP 1334: The volume provisioning management program 522 starts the storage control software 119 in the storage control module 15. In this example, storage control software 119 version 1.0 is started in control module 15b.

STEP 1336: The volume provisioning management program 522 sets LUN security (LUN masking) in LUN security table 154. In this example, a LUN security table 154 in the storage controller module 150b is updated as illustrated in FIG. 9C.

STEP 1338: The volume provisioning management program 522 or an administrator executes the OS retrieved in volume 112 in host 10b.

STEP 1350: The volume provisioning management program 522 checks if the previously-loaded storage control software 119 of the desired version number can be shared. An administrator may determine whether sharing is allowed, or the storage provisioning management program 522 may make the determination according to virtual machine execution priority or ratio according to the resource management table 593. If sharing of the storage control module 150 having the previously-loaded storage control software 119 of the desired version is allowed, the process goes to STEP 1352. If sharing is not allowed, the process goes back to STEP 1318.

STEP 1352: The storage control module management program 183 creates a new fibre channel zone in the FCSW 170.

STEP 1353: The volume provisioning management program 522 creates a new fibre channel zone in the FCSW 55.

STEP 1354: The volume provisioning management program 522 sets LUN security (LUN masking).

STEP 1356: The volume provisioning management program 522 executes the retrieved OS in the host 15*b*.

Additional Embodiments

Figure 15:
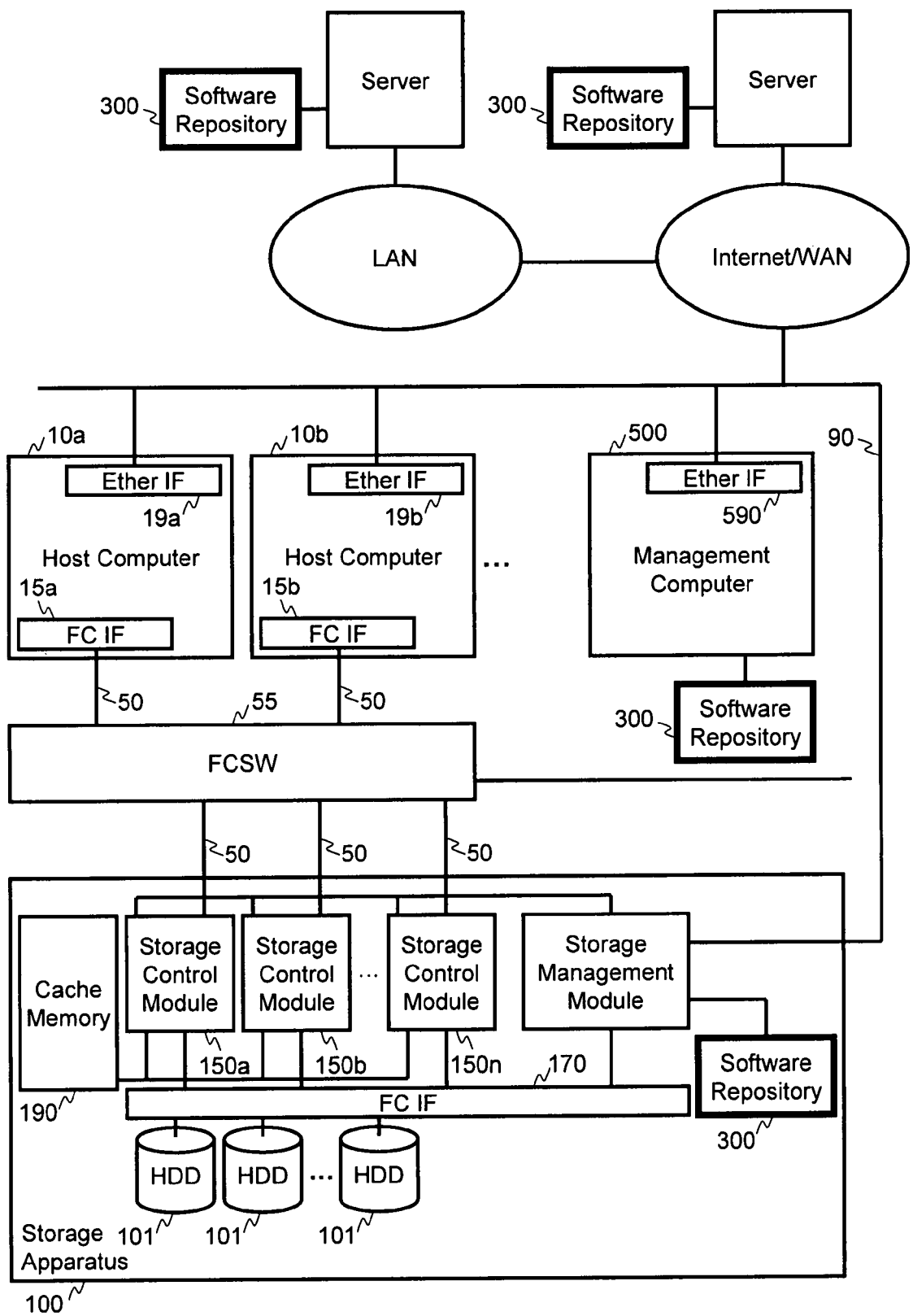
FIG. 15 illustrates variations of program repository locations.

FIG. 15 illustrates various other alternative locations for software repository 300. For example, the software repository 300 may deployed in the storage apparatus 100, a server accessible through a wide area network (WAN) and Internet, or other suitable location. If the appropriate version of the storage control software 119 cannot be found at one software repository 300, the storage control software upload program 523 may try accessing another software repository 300 by appropriate access methods and permissions.

Figure 16:
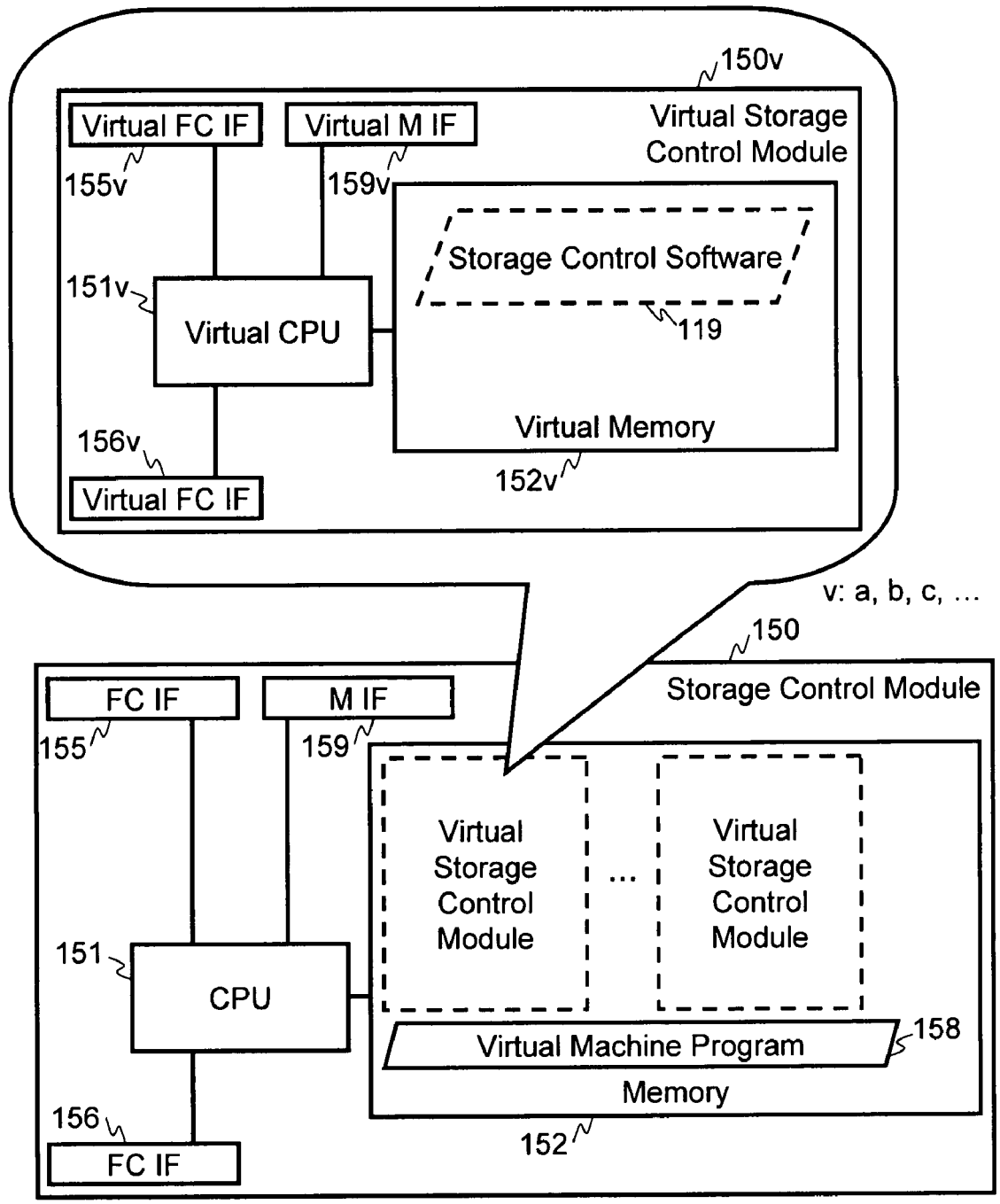
FIG. 16 illustrates a case in which the storage control module 150 has a virtual machine program.

FIG. 16 illustrates a case in which the storage control module 150 includes virtual machine program 158. The virtual machine program 158 allows the storage control module 150 to execute plural versions of the storage control software simultaneously by the creation of multiple virtual machines on a single storage control module 150. The virtual machine 150*v* in the storage control module 150 is composed of: a virtual CPU 151*v* for executing programs stored in a virtual memory 152*v* (the virtual memory 152*v* may store programs which are uploaded by the storage control software upload program 523 on the management computer 500); a virtual FC IF 155*v* having a unique WWN for connecting to the data network 50 via the FC IF 155; a virtual FC IF 156*v* having a unique WWN for connecting to the HDD 101 via FC IF 156; and a virtual management interface 159*v* (referred as Virtual MIF 159*v*) for connecting to the storage management module 180 via the MIF 159. As noted above, the use of a unique WWN for a virtual IF enables each virtual IF to be treated as a real IF. This enables the use of FC zoning and LUN security for the virtual IF in the same manner as if it were a real IF.

The storage control module management program 522 may have an extended resource management table 595 when a virtual machine is used in a storage control module 150. The extended resource management table 595 is illustrated in FIG. 18. When the storage control module management program 522 allocates a storage control module 150, the extended resource management table 595 is referred to and updated. The extended resource management table 595 is composed of: a row for holding storage control module number 5951; a row for holding physical CPU workload (minimum, maximum, average) 5952; a row for holding virtual storage control module number 5956; a row for holding status (not allocated, allocated, uploading, etc.) 5953; a row for holding storage control software version 5954; and a row for holding execution priority or ratio for controlling priority among virtual machines 5955.

Figure 19:
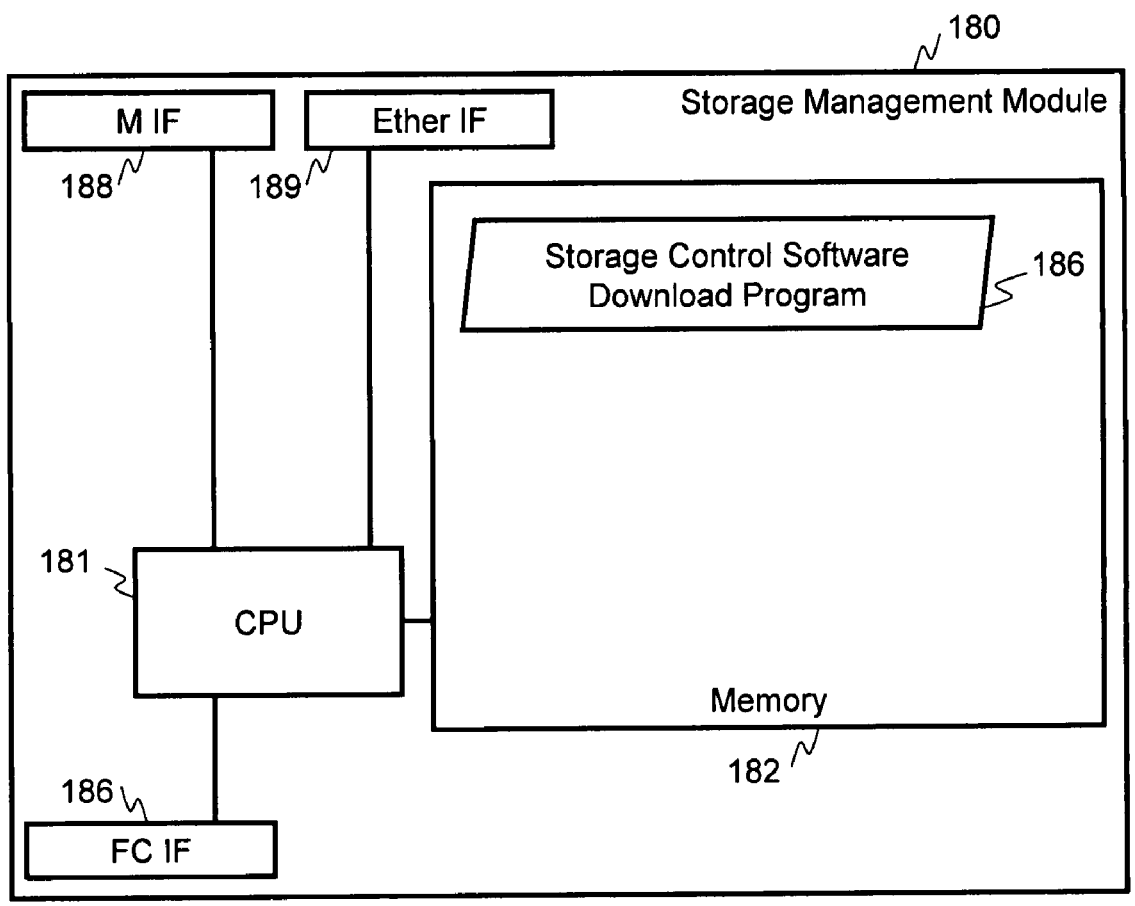
FIG. 19 illustrates another configuration for a storage management module.

FIG. 19 illustrates a configuration of another embodiment. The storage control module management module 180 has a storage control software download program 186 and also maintains the volume vs. OS management table 191. The storage control module management program 183 downloads appropriate storage control software 119 from the software repository 300 to the appropriate storage control module 150 without interaction with management computer 500.

Figure 20:
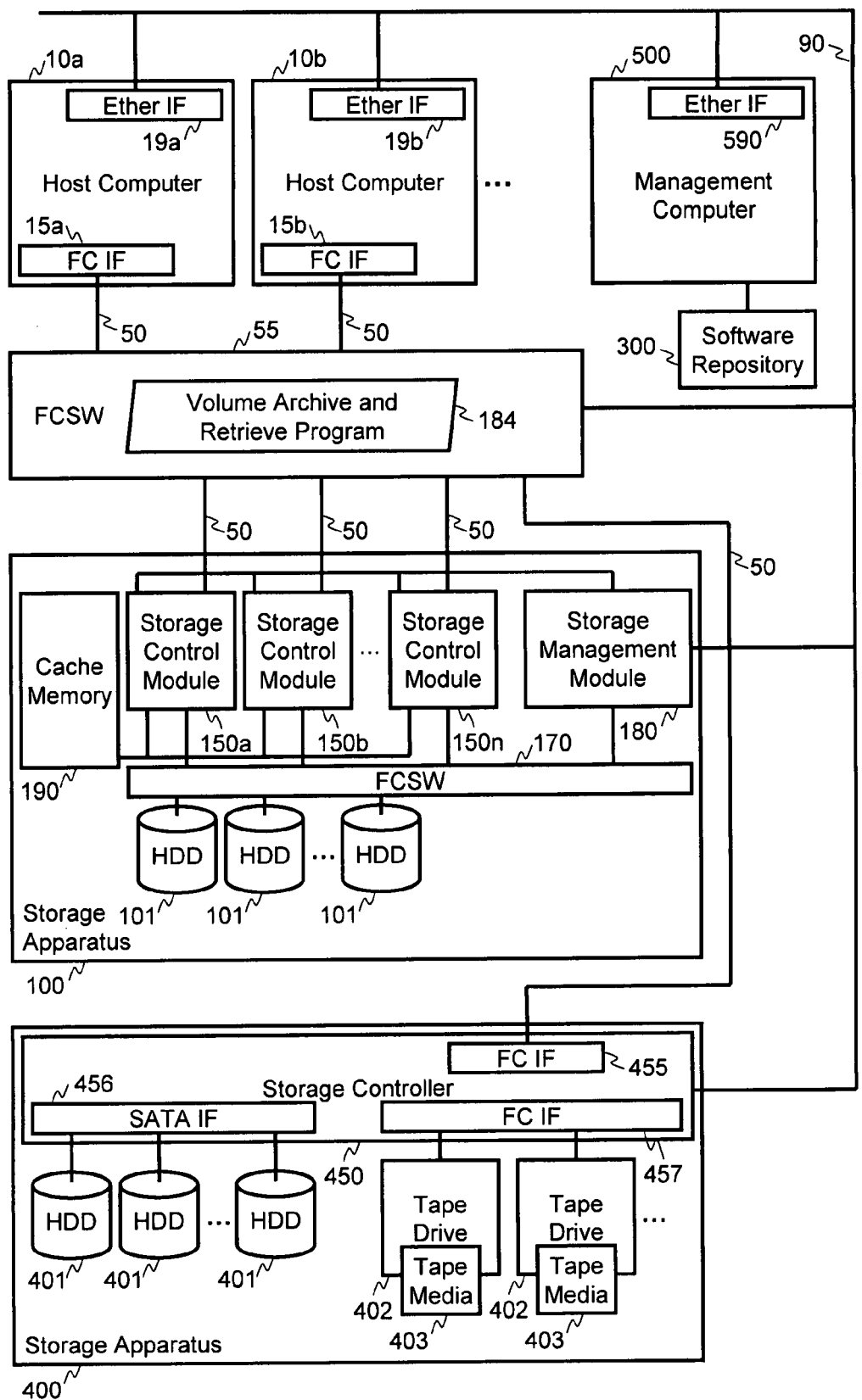
FIG. 20 illustrates an alternative embodiment of the invention in which the Fibre Channel switch executes the volume archive and retrieve program.
Figure 21:
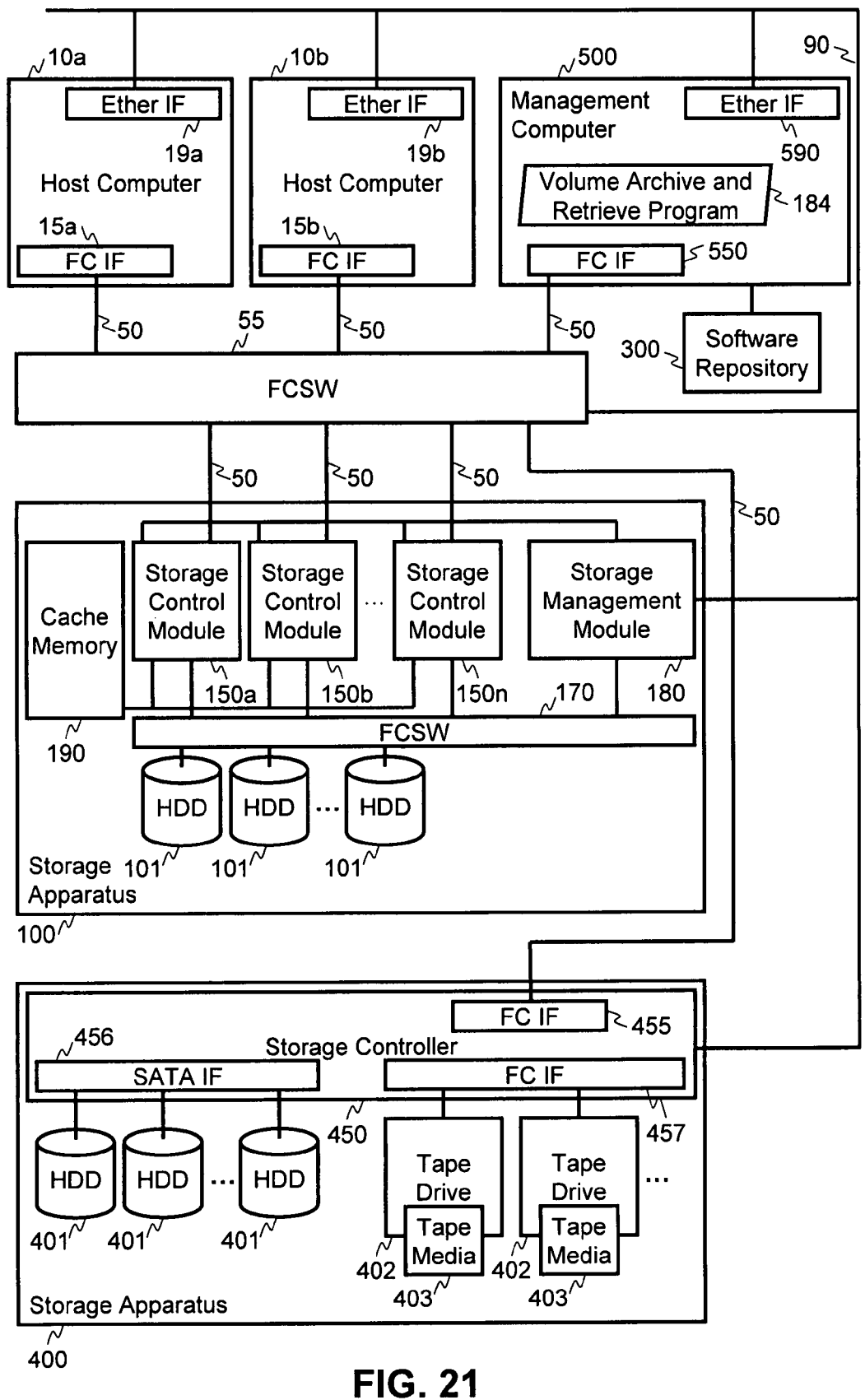
FIG. 21 illustrates an alternative embodiment of the invention in which the management computer executes the volume archive and retrieve program.

FIG. 20 illustrates a configuration of another embodiment. In this embodiment, the FCSW 55 includes a volume archive and retrieve program 184, thus relocating the processing for this function. Similarly, in the embodiment illustrated in FIG. 21, the management computer 500 includes the volume archive and retrieve program 184. In this case, the management computer includes a FC IF 550 for accessing to the storage apparatuses 100 and 400.

Figure 22:
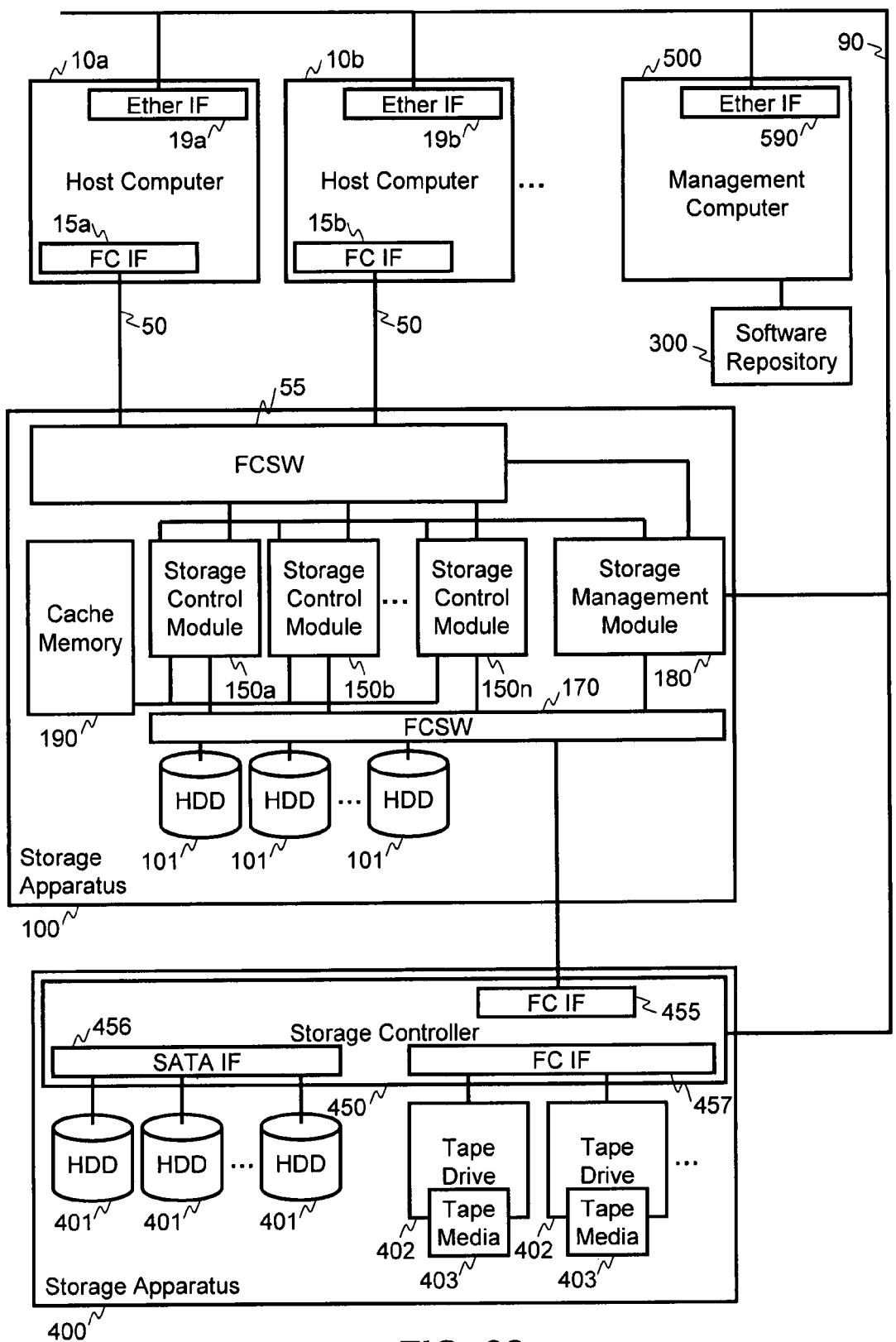
FIG. 22 illustrates an alternative embodiment of the invention in which the Fibre Channel switch is included in the storage apparatus.

FIG. 22 illustrates a configuration of another embodiment. In this embodiment, the storage apparatus 100 includes FCSW 55. In this case, the storage management module 180 can control FCSW 55 instead of the storage management computer 500.

As mentioned above, current problems regarding storage control software versions compatibility with OSs are solved by applying the appropriate versions of storage control software to the storage control module according to retrieved OS vendor and OS version. This invention is not limited by the number of storage modules, interface type, virtual machine type or number of host computers.

The storage consolidation taught by this invention reduces storage management costs, and the use of virtual machine technology allows a user to archive volume images which include old versions of OSs and applications, and these volume images can be restored and used whenever there is a demand.

Thus, it may be seen that the invention enables appropriate storage control software to be loaded according to a particular volume image and OS software. Further, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. A method of operating an information system, comprising:
    allocating a first volume on a first storage system, the first volume being allocated for use by a computer in communication with the first storage system;
    designating a control module on the first storage system for managing access to the first volume by the computer;
    determining a version of an operating system to be used on the computer when accessing the first volume;
    determining, based on a relationship between one or more versions of the operating system and one or more versions of a storage control software for controlling storing data sent from the operating system to a volume in the first storage system, a version of the storage control software which is compatible with the determined version of the operating system; and
    installing the determined version of the storage control software determined to be compatible with the determined version of the operating system on the control module of the first storage system.

2. A method according to claim 1, further including a step of
    automatically uploading the determined version of the storage control software over a communications network from a software repository.

3. A method according to claim 1, further including steps of
    creating a virtual machine on the control module of the first storage system prior to installing the determined version of the storage control software; and
    installing the determined version of the storage control software on the virtual machine created on the control module.

4. A method according to claim 1, further including steps of
creating multiple virtual machines on the control module of the first storage system, each said virtual machine including a virtual port for communication with said computer via a network; and
assigning a world wide name to each said virtual port, whereby multiple virtual ports may use a single real port, each said virtual port appearing as a real port on the network.

5. A method according to claim 1, further including steps of
retrieving a volume image into the first volume on the first storage system, the volume image including said operating system to be used on the computer and an application program to be operated on the computer; and
installing the determined version of the operating system, which is stored in said first volume, onto said computer from said first volume after said step of installing the version of the storage control software on the control module of the first storage system.

6. A method according to claim 5, further including steps of
creating a virtual machine on said computer prior to installing said step of installing the operating system onto said computer; and
installing said determined version of said operating system onto said virtual machine on said computer.

7. A method according to claim 1, further including steps of
archiving said first volume to an archive volume on a second storage system in communication with said first storage by copying the contents of said first volume, including the operating system to the archive volume; and
storing an information on the version and vendor of operating system included in the archive volume.

8. An information system comprising:
a first storage system, said first storage system including a plurality of storage devices for providing physical storage capacity for creating logical volumes;
a plurality of control modules in said first storage system for controlling access to said logical volumes;
a first computer in communication with said first storage system for accessing a first volume of said logical volumes;
wherein said first storage system is configured to select a first control module out of said plurality of control modules for controlling access of said first computer to said first volume;
wherein said first storage system is configured to install a particular version of a storage control program to said selected first control module, said particular version of said storage control program being determined to be compatible with a version of an operating system determined to be used on said first computer when accessing said first volume, based on a relationship between one or more versions of the operating system and one or more versions of the storage control program for controlling storing data sent from the operating system to a volume in the first storage system.

9. A system according to claim 8, further comprising
a software repository in communication with the first storage system via a communications network, wherein said first storage system is configured to receive the particular version of the storage control software over the communications network from the software repository.

10. A system according to claim 8, further comprising
a virtual machine program installed on said first storage system for configuring a virtual machine on the first control module of the first storage system prior to installing the particular version of the storage control software so that the particular version of the storage control software is installed on the virtual machine configured on the first control module.

11. A system according to claim 8, further comprising
a second computer in communication with the first storage system, wherein said second computer is configured to determine the determined version of the operating system to be used on the first computer, and determine the particular version of the storage control software that is compatible with the operating system.

12. A system according to claim 8, further comprising
a second storage system in communication with the first storage system, wherein said first storage system is configured to retrieve a volume image from the second storage system into the first volume on the first storage system, the volume image including said determined version of said operating system to be used on the first computer and an application program to be operated on the first computer.

13. A system according to claim 8, further comprising
a virtual machine program on said first computer for creating a virtual machine on said first computer prior to installing the determined version of the operating system onto said first computer, so that the determined version of the operating system is installed onto said virtual machine on said first computer.

14. A system according to claim 8, further comprising
a second storage system in communication with said first storage, wherein said first storage system is configured to archive said first volume to an archive volume on said second storage system by copying the contents of said first volume, including the operating system to the archive volume, and by storing an information of the version and vendor of operating system included in the archive volume.

15. A method of operating an information system, comprising:
allocating a first volume on a first storage system, the first volume being allocated for use by a first computer in communication with the first storage system;
designating a first control module from among multiple control modules on the first storage system for managing access to the first volume by the first computer;
determining a vendor and version of a first operating system to be used on the first computer when the first computer accesses the first volume;
determining a version of a storage control software compatible with the vendor and version of the first operating system by referring to a first information stored on the first storage system, the first information including a relationship between one or more vendors and versions of the first operating system and one or more versions of the storage control software for controlling storing data sent from the first operating system to a volume in the first storage system;
receiving automatically over a network from a software repository the determined version of the storage control software determined to be compatible with the vendor and version of the first operating system; and
installing on the first control module determined version of the storage control software, whereby said first computer is able to use said first operating system when accessing said first volume via said first control module.

16. A method according to claim 15, further including steps of
- creating a first virtual machine on the first control module of the first storage system prior to installing the determined version of the storage control software; and
- installing the determined version of the storage control software on the first virtual machine created on the control module.

17. A method according to claim 16, further including steps of
- creating a second virtual machine on the first control module of the first storage system;
- installing a different second version of the storage control software on the second virtual machine created on the control module to enable a second operating system to be used with first control module, said second operating system having a different vendor or version than said first operating system.

18. A method according to claim 15, further including steps of
- retrieving a volume image into the first volume on the first storage system from a second storage system in communication with the first storage system, the volume image including said vendor and version of said first operating system to be used on the first computer and an application program to be operated on the first computer; and
- installing, the vendor and version of the first operating system onto said first computer from said volume after said step of installing the version of the first storage control software one the first control module of the first storage system.

19. A method according to claim 18, further including steps of
- creating a virtual machine on said computer prior to said step of installing the vendor and version of the first operating system onto said first computer; and
- installing said vendor and version of said first operating system onto said virtual machine on said first computer.

20. A method according to claim 15, further including steps of
- archiving said first volume to an archive volume on a second storage system in communication with said first storage by copying the contents of said first volume, including, the vendor and version of the first operating system to the archive volume; and
- storing in said first storage system a second information on the version and vendor of first operating system included in the archive volume.

21. A method according to claim 4, further comprising:
- controlling at least one of execution priority or ratio among the virtual machines based on an execution priority or ratio for each of the virtual machines.

* * * * *